(12) United States Patent
Fradet

(10) Patent No.: US 9,522,737 B2
(45) Date of Patent: Dec. 20, 2016

(54) HOLDING CONTAINER FOR SHOCK ABSORBING SELF-DEPLOYABLE DEVICE

(71) Applicant: Eric Fradet, Le Tignet (FR)

(72) Inventor: Eric Fradet, Le Tignet (FR)

( * ) Notice: Subject to any disclaimer, the term of this patent is extended or adjusted under 35 U.S.C. 154(b) by 125 days.

(21) Appl. No.: 14/307,673

(22) Filed: Jun. 18, 2014

(65) Prior Publication Data

US 2014/0367514 A1 Dec. 18, 2014

(30) Foreign Application Priority Data

Jun. 18, 2013 (FR) .................................... 13 55707

(51) Int. Cl.
*B64D 17/78* (2006.01)
*B64D 17/30* (2006.01)
*B64D 1/14* (2006.01)

(52) U.S. Cl.
CPC ............. *B64D 17/78* (2013.01); *B64D 1/14* (2013.01); *B64D 17/30* (2013.01); *B64D 2201/00* (2013.01)

(58) Field of Classification Search
CPC ........... B64D 1/14; B64D 17/30; B64D 17/78; B64D 17/80; B64D 25/00; B64D 2201/00; B64C 31/00; B64C 31/028; B64C 31/0285
See application file for complete search history.

(56) References Cited

U.S. PATENT DOCUMENTS

| 2,408,088 | A | | 9/1946 | Miller et al. | |
|---|---|---|---|---|---|
| 3,129,910 | A | * | 4/1964 | Smith | B64D 17/78 244/107 |
| 3,372,893 | A | * | 3/1968 | Larsen | B64C 3/30 244/13 |
| 3,926,391 | A | * | 12/1975 | Nordine | B64D 17/725 244/149 |

(Continued)

FOREIGN PATENT DOCUMENTS

| CH | 689 252 A5 | 1/1999 |
|---|---|---|
| EP | 0 903 289 | 3/1999 |

(Continued)

OTHER PUBLICATIONS

Connect Reverse, retrieved Apr. 15, 2016, Swing http://www.swing.de/connect-reverse-en.html.*

(Continued)

*Primary Examiner* — Joseph W Sanderson
(74) *Attorney, Agent, or Firm* — Young & Thompson

(57) ABSTRACT

A device for absorbing impacts of a parachutist or air-dropped package upon landing, which can equip a harness, and/or a skydiver or dropping pallet for performing the aircraft jump without any risk of interferences, allows, during the aircraft exit and free fall, to hold, neutralized in a reduced volume, an air-inflatable airbag, for deployment during the canopy descent. It includes a container back pad hooked to the harness and/or to the user or to the dropping pallet, which can be made removable by straps and bridles, in which an airbag is arranged such that its air scoop is (Continued)

closed by flaps locked by a cutaway cable. When the user exerts an action on the opening handle or when the parachute opens, the cable separates the flaps, allowing to unballast the airbag and open the air scoop to the air flow from the movement of the harness during the descent.

17 Claims, 15 Drawing Sheets

(56) References Cited

U.S. PATENT DOCUMENTS

| | | | | |
|---|---|---|---|---|
| 6,431,495 | B1* | 8/2002 | Lawyer | B64D 17/32 244/149 |
| 6,708,927 | B2* | 3/2004 | Chen | A62B 1/22 182/230 |
| 2003/0222178 | A1* | 12/2003 | Chen | A62B 1/22 244/143 |
| 2005/0062274 | A1 | 3/2005 | Snellgrove | |
| 2006/0181067 | A1* | 8/2006 | Maripudi | B60R 21/239 280/736 |
| 2013/0092796 | A1* | 4/2013 | Weinel | A45C 13/021 244/149 |

FOREIGN PATENT DOCUMENTS

| | | |
|---|---|---|
| FR | 2 768 698 | 3/1999 |
| FR | 2 942 204 | 8/2010 |

OTHER PUBLICATIONS

Connect Reverse Instruction Manual, May 13, 2009, Swing, Version 1.1, available at http://www.swing.de/tl_files/content/produkte/gurtzeug/connect/connect-reverse/downloads/manual.connectreverse_HI.en.pdf.*

French Search Report dated Apr. 3, 2014, corresponding to the Foreign Priority Application No. 1355707.

European Search Report, dated Nov. 12, 2014, from corresponding EP application.

* cited by examiner

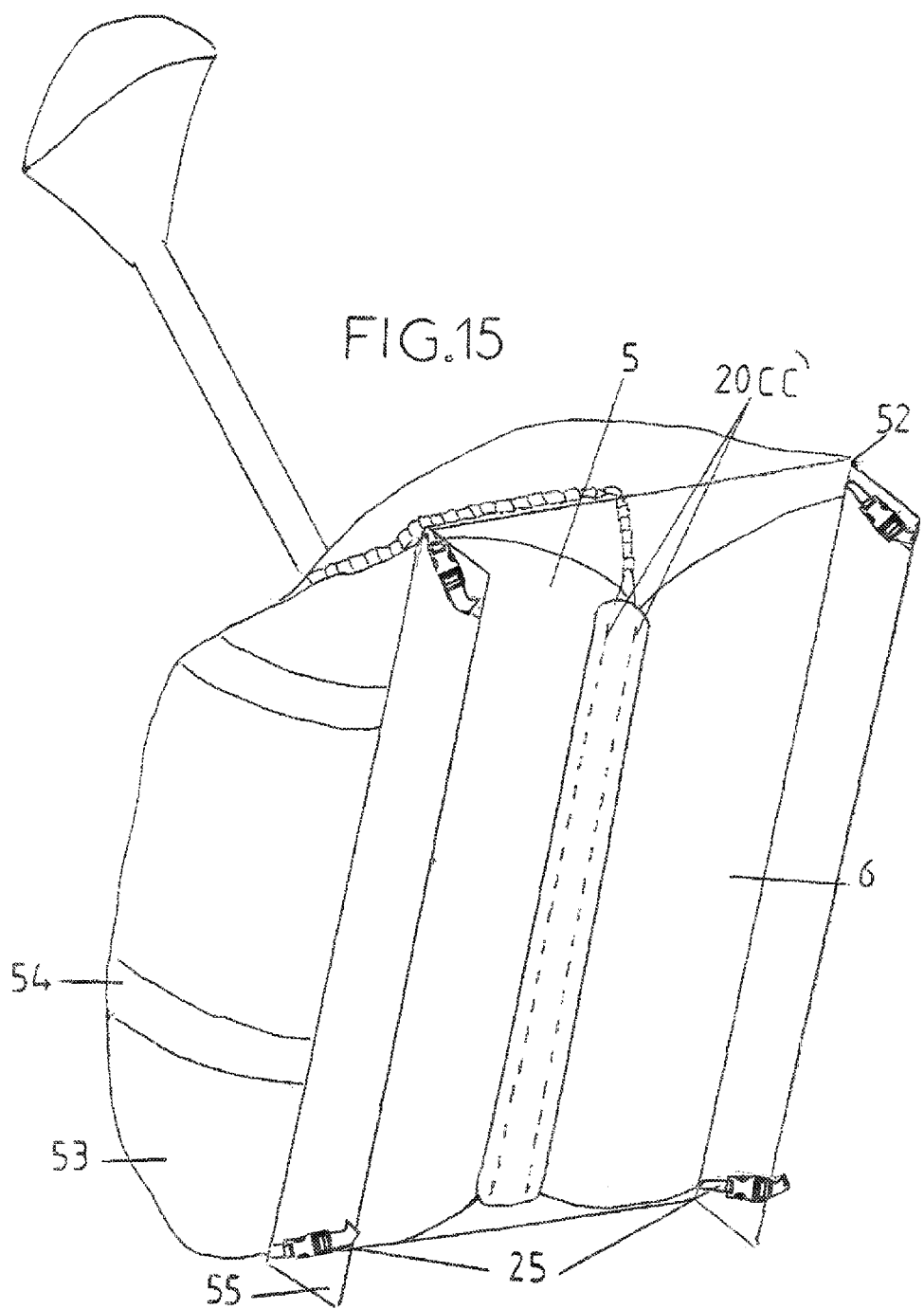

HOLDING CONTAINER FOR SHOCK ABSORBING SELF-DEPLOYABLE DEVICE

CROSS REFERENCE TO RELATED APPLICATIONS

Applicant claims priority under 35 U.S.C. 119 of French patent application no. 1355707 filed on Jun. 18, 2013.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The invention relates to the field of skydiving. There is currently no equipment for absorbing shocks in skydiving.

BRIEF SUMMARY OF THE INVENTION

The present invention relates to a holding container which equips a harness, a parachutist or a pallet of airdropped package, and the opening of which controls a shock absorbing self-deployable device in order to reduce the landing impact to the user or the airdropped package. The container according to the invention has an airbag acting as a cushion, inflatable by the air flow from the movement of the parachute harness during the canopy descent, allowing to absorb the shocks during landing. Said airbag can be formed as a single inflation bag, provided with one or more air scoops, or otherwise be constituted by several inflation bags.

The airbag is folded and remains in a first essentially "flat" position thanks to a restraining means obtained by closing the container, toward a second unfolded position when said container and the airlock are open. The invention especially aims to provide a container which allows to contain a shock absorbing device in a reduced volume in order to perform the aircraft exit and the free fall and which, when activated during the open canopy descent, operates as those known in slope soaring (parapente).

The object of the invention can be included in the construction of a parachute harness, removably added to the existing parachute jump harnesses and/or added on the user's body or on a pallet of airdropped package.

According to an embodiment, the protection surface can be limited for a parachutist from the lumbar back region to the crotch region, or extended to an upper protection surface of the user's lower limbs or to the pallet surface in the case of an airdropped package. The back pad of the container oriented facing the user's back thus constitutes a support bottom flap which can protrudingly extend under the user's thighs, while the face opposite to the face extending in use on the protection region is used to accommodate the inflatable airbag.

When positioned on a pallet of airdropped package, the back pad of the container is positioned on the back of the pallet raised by two pallet rails so that the container flaps are not rubbing against the aircraft hold.

The inflatable airbag can, by folding on itself, constitute the container, in which case the airbag is made integral with the container into a one and only assembly by stitching. Other manufacturing techniques ensure the same result such as bonding or high-frequency welding, if the material binding the container and the airbag is heat-weldable.

When the container is permanently attached to the harness of a user, its back pad is preferably sewn on the back strap and on the webbing bridges to the legstraps. It is then provided with free flaps sewn to the periphery of the back pad intended to enclose the removable airbag attached to the back pad on the side opposite to the side on which the user leans during use.

In cases where the container and the airbag are a one and only assembly, the container enclosing the airbag can be detached from either the pallet of airdropped package or the harness and/or the user, the removability being made possible by a hooking element set such as loops, snaps, clips, hook and loop fasteners, zipper, buttons or other similar elements.

More particularly, the invention relates to containers generally constituted by a back pad comprising attaching means to the harness and/or to the user or to a pallet for airdropped package, and forming, in combination with flaps, a closed envelope constituting an airbag inflatable by the air flow passage when the air scoop, located in front with respect to the movement direction, is open.

Before use, the container is compressed and folded on itself to be used as a preferably folded, closing means such that at least one container flap forms an airlock to close the air scoop such that it causes no discomfort and can be incidentally deployed at will during the canopy descent.

According to prior art, the volume inflated beforehand of known devices such as those for slope soaring and described in French patents FR 2768698 or FR 2942204, prevents their use in free fall due to the massive bulk and to the increase of interference risks when opening the parachute.

The solution suggests to provide a compressible airbag enclosed in a container or forming a container, intended to equip, by removable or permanent addition according to the selected embodiment, a parachutist and/or its jump harness, or a pallet of airdropped package, and then to be shaped in an unfolded use state by means of a single or multiple operation performed during the open canopy descent.

This result is obtained after releasing the airbag by concurrently opening flap(s) closing one or more air scoops arranged on the airbag face oriented in front with respect to the movement direction. The flap can be comprised of one of the flaps, the air scoop is located between the user's calves when the latter uses a ram-air type parachute, and oriented toward the lower part of the user's legs in the use position, or located opposite the back pad of the container and oriented toward the ground when a container for a round parachute type jump having an essentially vertical movement is used.

Passing from the closed configuration to the deployed configuration is performed after the parachute opening, without any action other than the manual or automatic unlocking of means allowing to block the airbag in the folded position and means allowing to block the air scoop, or by means of a combination of these means together.

The objective is achieved in that, in the preferred embodiment, unblocking only one means allows to unfold the airbag and present the opening of its air scoop to the air flow created by the movement of the parachute, allowing the container to pass to a maximum volume. The container of the invention is provided with a back pad and its associated flaps constituting an airbag, adapted to be folded back in the closing mode by locking or interlocking means, provided on their edges.

It is anticipated to use means for assembling and restraining the flaps, known in themselves, for example one of the flaps carrying buckles cooperating with hooks carried by the other flap for hooking them to each other or a linking piece carrying buckles attaching on both flaps carrying buckles, such as, for example, a model known in the art of the base jumping parachute which consists in a middle cover flap having a male gripping tape holding closing flaps of the container assembled, where female gripping tape has been arranged.

Another preferentially used means consists in a system of complementary loops and grommets closed by a locking member such as a cutaway cable holding them assembled in the closing position.

In a simplified alternative, the lateral flaps of the airbag are compressed by a belt, and the air scoop closed separately. Other means for holding and implementing the airbag becoming an inflatable cushion can be used by the one skilled in the art.

The action of opening the holding container associating the decompression and the inflation of the shock absorbing device can be performed by remote control means comprised of a handle operating a cutaway cable, or controlling a blanking flap to release the air scoop.

To temporarily add the container of the invention to an airdropped package provided with a pallet with a harness or to a parachutist equipped with a harness, are provided half-belts or straps provided with buckles intended to hold and adjust the top of the back pad of the container either to each corner of the back of the pallet or to the waist of the user or to the harness, and adjustable straps, called bridles intended to pass on and around the thighs.

Because of this adjustment of the top of the container to the harness of a parachutist equipped with a ram-air type parachute, it has been noted that, during the canopy descent, the ease and space of the user in its harness were reduced, such that a means for reducing and giving some "slack" in the straps of the top of the container is provided, by means of a connecting and disconnecting system preferably connected to the container handle. The "slack" reduction of the straps occurs before the use at the aircraft exit and in free fall, and said "slack" release occurs after the parachute opens simultaneously with the container opening.

In the preferred embodiment of the invention, the device appears on the user as a back pad constituting, with two lateral flaps arranged facing each other, as a foldable container having a square, rectangular or trapezoidal shape, possibly indented between the legs, foldable into a flat position along one or several folding lines.

The holding container of the invention for a ram-air type parachute jump comprises a shock absorbing device comprised of an airbag made of flaps connected along ridges which form, in the deployed position, faces which are substantially parallel to each other, the inflatable cushion is preferably parallelepiped-shaped, when the device is deployed it has a front face extending from the front edge of the back pad of the container and a rear face extending from the rear edge of the back pad, the air scoop distinguishing one face from the other, and the lateral faces of the airbag extend from the lateral edges of the back pad of the container.

In an alternative embodiment, the container can be formed of two free flaps outside the airbag constituting a lateral closing means, to which a lower closing flap can be added, which can be reduced to mini-flap(s) and possibly incorporate means for retracting the free flaps.

When the container according to the invention is arranged on a tandem passenger harness, it has been observed that the deployment of the airbag is hindered because of the discomfort caused by the proximity of the tandem pilot body located behind and against the back of the passenger carrying the device according to the invention, and it is therefore necessary that the tandem pilot helps him/her by manually separating the edges of the free flaps to allow the airbag to be extracted by gravity.

Such a handling takes more time and can be difficult to perform when it relates to jumps performed by night while carrying thick gloves, forcing the tandem pilot to manipulate the container to open it more widely.

To promote the airbag fall after the extraction movement of the cutaway cable(s) of the container and to therefore allow its easy deployment without any further manual action, pull-up cord(s) connected to each free lower end of the free flaps of the container are provided, each pull-up cord being intended to fold back the free end of each free flap on itself with a corner shape outwardly from the container. The other end of the pull-up cord is connected to the container handle, coupled to the cutaway cable(s).

The self-deployment of the airbag is obtained after having manually operated the handle which successively controls, with the same movement, the cutaway cable(s) of the flaps which maintain the airbag in the folded position, and the spacing of the free flaps, which has the effect of leaving free space for the airbag to fall by gravity.

At this stage of the container opening, the presence of the tandem pilot in contact with the back of the passenger equipped with the container according to the invention can still prevent by friction the fall and the deployment of the airbag.

The deployment and the inflation acceleration of the airbag are advantageously performed by ballast with compartments having weights, the ballast can for example be comprised of lead balls or of sand, placed in a pocket sewn on the lower edge of the airbag, particularly on the lower edge of the air scoop in the use position.

According to an embodiment, a flap is arranged in front of the air scoop for closing it during the free fall, said flap being operable by the user for exposing the air scoop of the airbag so as to deploy the inflatable cushion after the parachute opening.

According to an embodiment, the back pad is sewn, bonded or welded to the lower half of the harness and to the webbing bridge of the legstraps with the harness.

Generally, the back pad will be sewn, but if the material constituting the airbag is heat-weldable, a high-frequency welding attachment is possible, as well as bonding.

According to an embodiment, the back pad is either integrally attached to the lower part of the harness, or a back pad portion is attached to the lower half of the harness, the remaining portion of the back pad of the container being attached to each of the user's thighs by bridles closing around each of the user's thighs or around the legstraps.

According to another embodiment, the back pad is removably attached at an end by straps closing by a first locking means around the back strap of the harness of the user, around the main lift webs of the harness or in hip rings of the main lift webs of the harness located at the user's hips, and at the other end to the legstraps or to each of the user's thighs by bridles closing around them.

According to an embodiment, one end of the back pad is removably attached around the back strap, around the main lift webs or in linking rings of the main lift webs, and the other end of the back pad is attached to each of the user's thighs by bridles closing around each of the user's thighs or around the legstraps, wherein said straps have a second locking means which can be unlocked by the user, at a distance from the first locking means or the elastic material straps.

An advantage of this configuration is that the device is comfortable once the container is open, since the user has more slack for his/her movements, while having a minimal movement clearance before the parachute opening, when the container is closed.

According to an embodiment, the back pad is attached at an end by two half-belts surrounding the user's waist, and at the other end by bridles closing around each of the user's thighs or around the legstraps.

According to another embodiment of the container, the back pad equipping a pallet for airdropped package is attached by bridles surrounding each end of the pallet for airdropped package.

According to an embodiment, the inflatable cushion is removably attached to the back pad.

It is thus possible to change the airbag while keeping the back pad.

According to an embodiment, the inflatable cushion is permanently attached to the back pad.

According to an embodiment, the airbag, in the deployed position of the inflatable cushion, has two opposite parallel flaps, substantially perpendicular to the plane of the back pad and extending from the lateral edges of the back pad, the means for restraining the inflatable cushion being composed of means for hooking one of said two flaps cooperating with a complementary hooking means carried by the other one of said two flaps so as to hook them to each other and thus compress the inflatable cushion and close its air scoop, said hooking means further optionally cooperating with a complementary hooking means carried by the back pad or airbag.

According to an embodiment, the edge of the rear face of the airbag opposite to the edge attached to the back pad of the container carries a hooking means cooperating with a complementary hooking means carried by the edge of the front face attached to the back pad of the container for constituting the means for restraining the inflatable cushion, by compressing it and closing its air scoop, both faces being then attached along a line substantially parallel to the front and rear edges of the back pad of the container.

According to an embodiment, the back pad carries two free lateral flaps of the airbag, extending along the lateral edges of the back pad, the means for restraining the inflatable cushion being composed of a means for hooking one of the flaps cooperating with a complementary hooking means carried by the other one of the flaps so as to hook them to each other and thus compress the inflatable cushion and close its air scoop, said hooking means further optionally cooperating with a complementary hooking means carried by the back pad of the container, a flap or the airbag.

The means can then be carried by the face of the back pad oriented toward the user, in use, or on the face of the opposite side of the back pad on which the cushion is attached.

According to an embodiment, the back pad carries only one free lateral flap of the airbag, extending from one of the lateral edges of the back pad, said lateral flap being provided with a hooking means adapted to cooperate with a complementary hooking means carried by the other lateral edge of the back pad, for constituting the means for restraining the inflatable cushion, by compressing it and closing its air scoop.

According to an embodiment, the hooking means and the complementary hooking means are one or more among a hook and loop fastener system, a snap fastener system, a closing loop and grommet system or a half-belt system carrying a loop cooperating with a half-belt carrying a hook for hooking the flaps to each other.

For the hook and loop fastener embodiment, one of the flaps carrying the loops cooperates with hooks carried by the other flap for hooking them to each other or a linking piece carrying the loops is attached to both flaps carrying hooks.

According to an embodiment, the flap width is substantially equal to the half width of the back pad, and said flaps are secured along one of their edges following a median line of the back pad parallel to the lateral edges thereof.

According to an embodiment, the hooking means and the complementary hooking means are comprised of a lacing system having hooks and of a retractable link surrounding said hooks.

According to an embodiment, the hooking means and the complementary hooking means are comprised of a closing loop and grommet system, the loops being passed through the grommets arranged facing each other. A cutaway cable is then passed through the loops, said cutaway cable being connected to the container opening system.

The invention also relates to a harness for a parachutist or an airdropped package, wherein it is provided with a container as described above.

The invention also relates to a harness bag for a parachutist, characterized in that it is provided with a container as described above.

BRIEF DESCRIPTION OF THE SEVERAL VIEWS OF THE DRAWING

Other features and advantages of the invention will become more apparent upon reading the following description of various alternative embodiments, with reference to the drawings, in which:

FIG. 15 is a bottom view of a pallet of airdropped package equipped with the container of the invention.

DETAILED DESCRIPTION OF THE INVENTION

Figure 1:
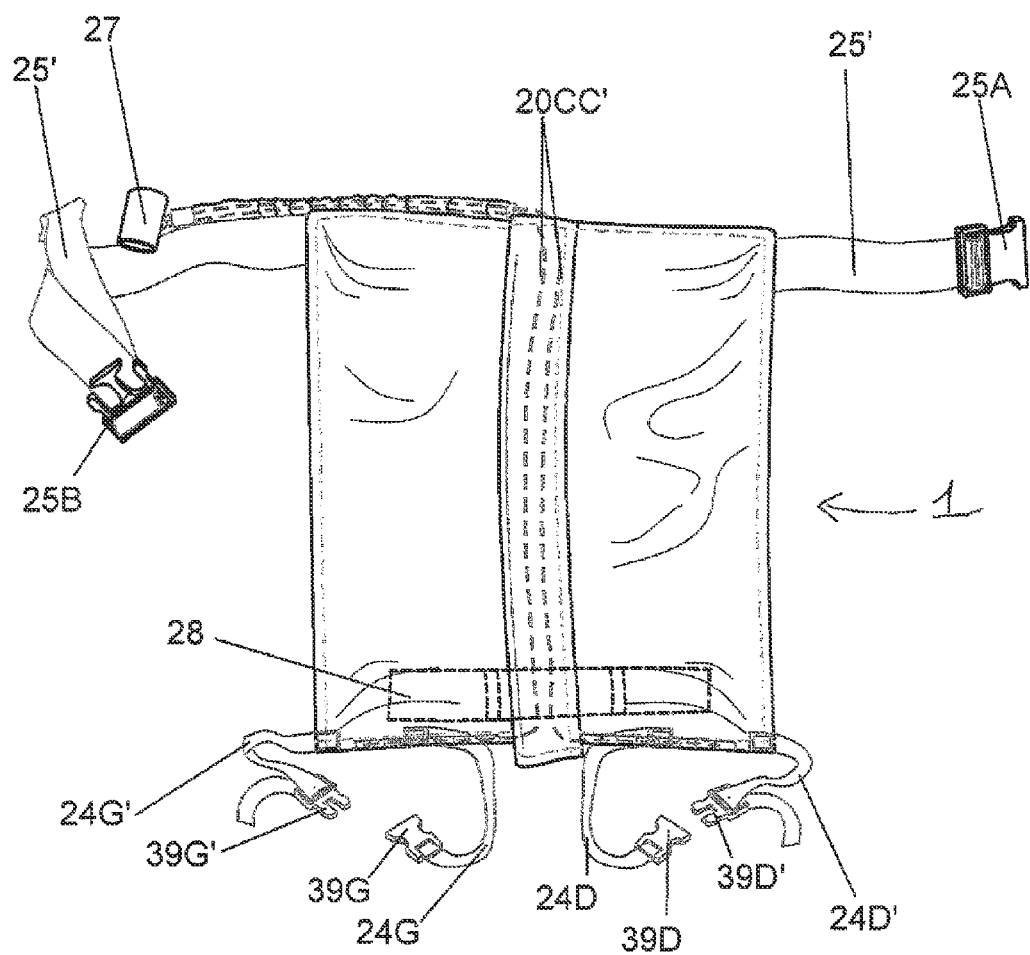
FIG. 1 is a view of the preferred embodiment of the container of the invention in the closed position.

FIG. 1 shows the preferred embodiment of the container 1 of the invention in the closed position before its use.

In order to provide the double function of support and adjustment of the container 1 to the user, straps or any type of longitudinal flexible member for ensuring the attachment and the connection of the container 1 to the user are provided.

The assembly of the top of the container 1 to the parachutist is ensured by means of an abdominal strap composed of two half-belts 25' located on the upper corners of the back pad of the container and adapted to cooperate together so as to surround the user's waist, this arrangement being preferred since it offers a simplicity of use and an independence of the harness.

A half-belt 25' has a fixed length and is provided with a female hooking buckle 25A while the other half-belt 25' is provided with a male hooking buckle 25B complementary with the previous one, sliding on its strap length, making the latter self-adjustable once the buckles are locked.

The container handle 27 is attached on one of both half-belts 25'. It requires to be operated to perform the airbag deployment and its inflation in the air flow.

Furthermore, for ensuring that the bottom of the container 1 is maintained, at each lower angle of the container 1, bridles 24D' and 24G' are provided for passing on and around the person's thighs or around the legstraps of the harness, in cooperation with bridles 24D and 24G located respectively at the first third of the right and left sides from the bottom of the container 1, this arrangement allowing to prevent the bottom of the container 1 from going up by means of the blocking and clamping performed around the user's thighs or the harness legstraps, by a mutually complementary buckle means, integral with each of said bridles.

The bridles 24D and 24G carrying at their ends the female buckle 39D and 39G have a fixed length and are intended to cooperate with the male complementary buckles 39D' and 39G'.

Figure 2:
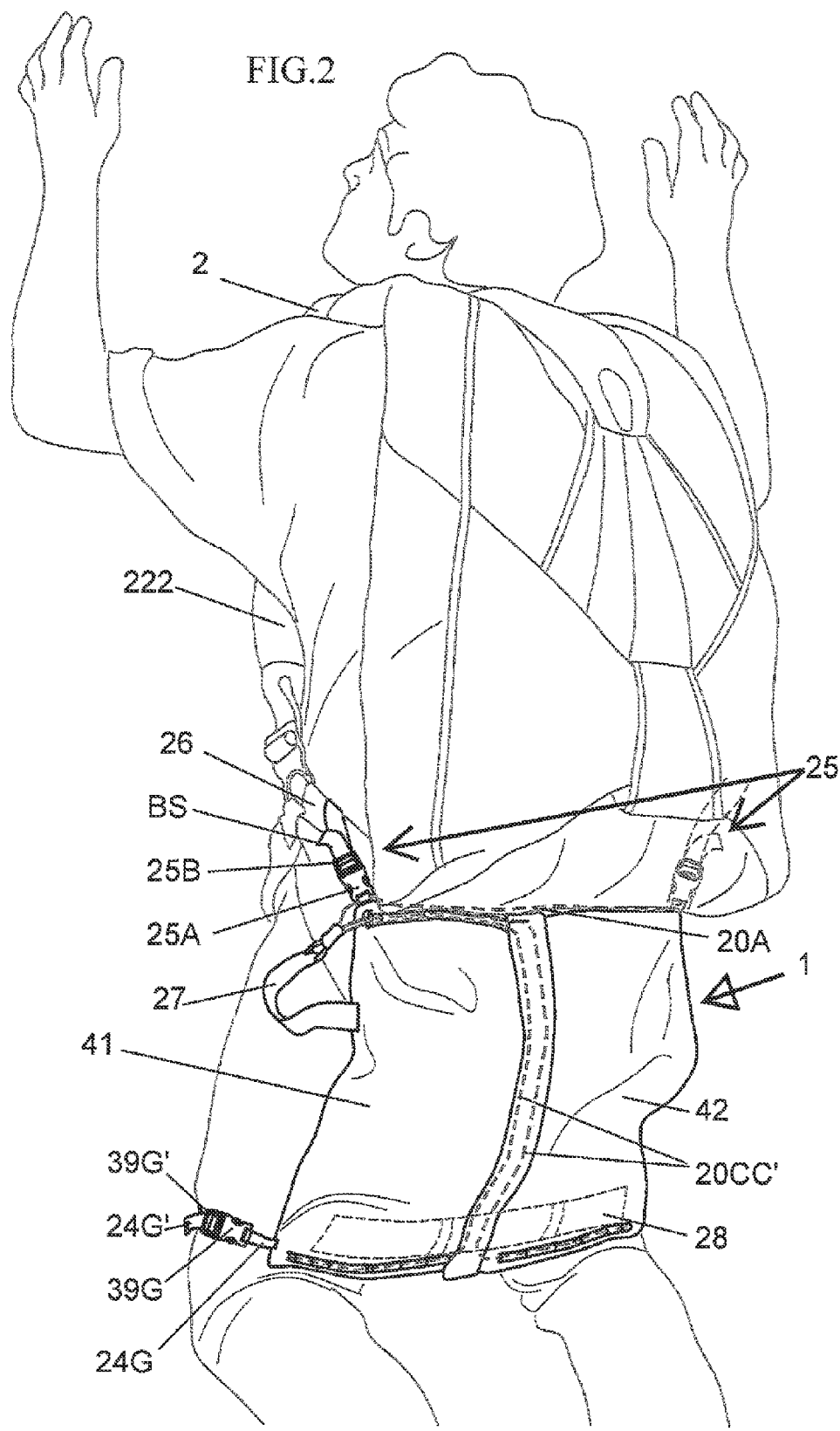
FIG. 2 is a view of a free fall parachutist equipped with an alternate embodiment of the container of the invention in the closed position.

The embodiment shown in FIG. 2 shows an alternate embodiment of the holding container arranged on the harness 2 of a parachutist during the free fall, and before its use during the canopy descent.

The assembly of the top of the container 1 differs from FIG. 1 in that it is connected to the harness 2 by means of a set of two straps 25 each having a self-adjustable length branch, arranged from the upper angles of the back pad of the container 1.

Figure 3:
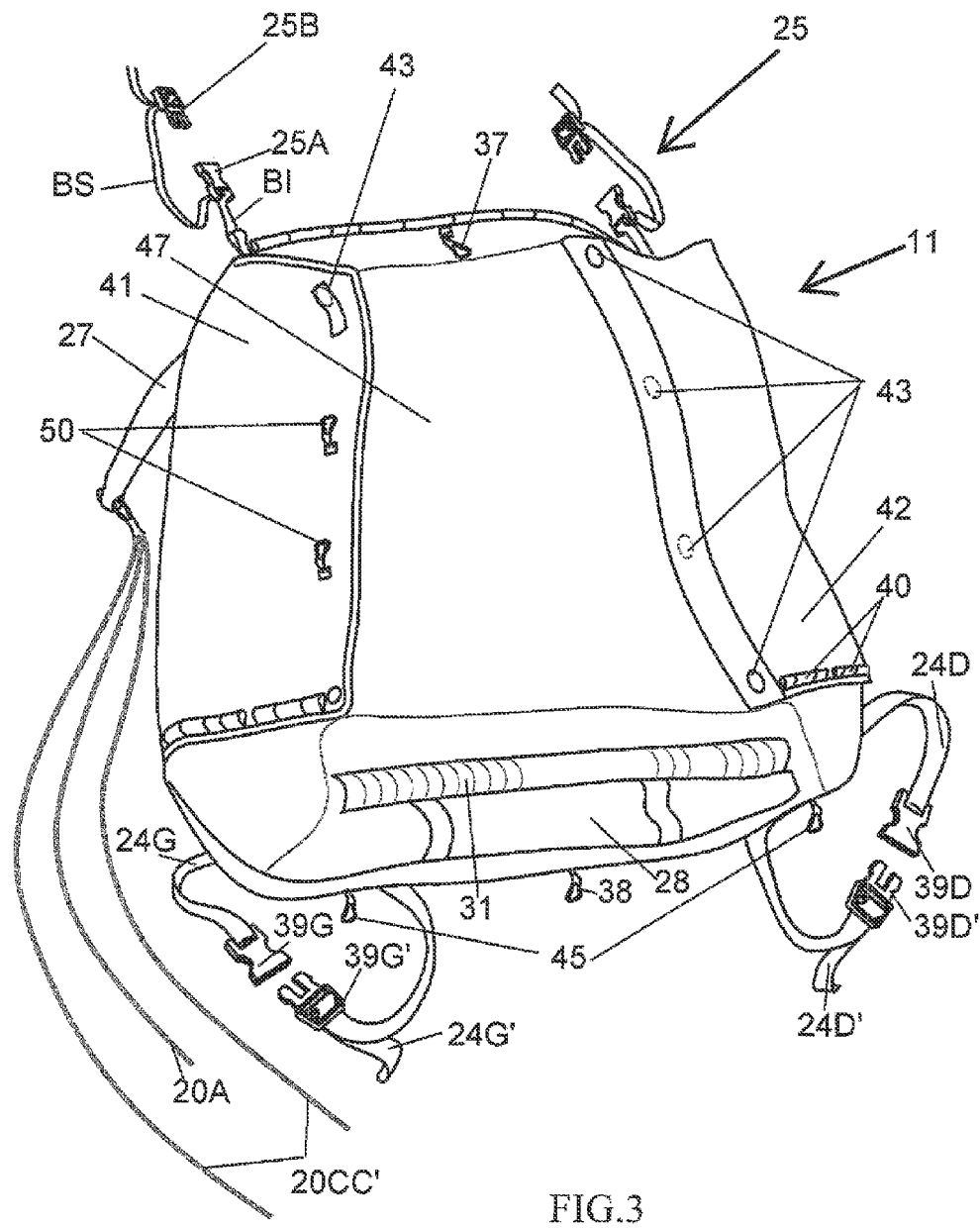
FIG. 3 is a view showing the container of FIG. 2 in the open position and separated from the harness.

Said straps 25, which can be seen in FIG. 3, are each provided with an adjustable length lower branch BI and an adjustable-length upper branch BS allowing to encircle and adjust the top of the container 1, either around the back strap 26 of the harness 2, or around the main lift webs 222 or hip rings, thereby allowing to couple the container 1 to the harness 2.

After locking both autolocking buckles 25A and 25B together, the position of the container 1 with respect to the harness 2 is obtained by adjusting the length the upper branch BS, in the toothed part of the buckle 25B.

Figure 5:
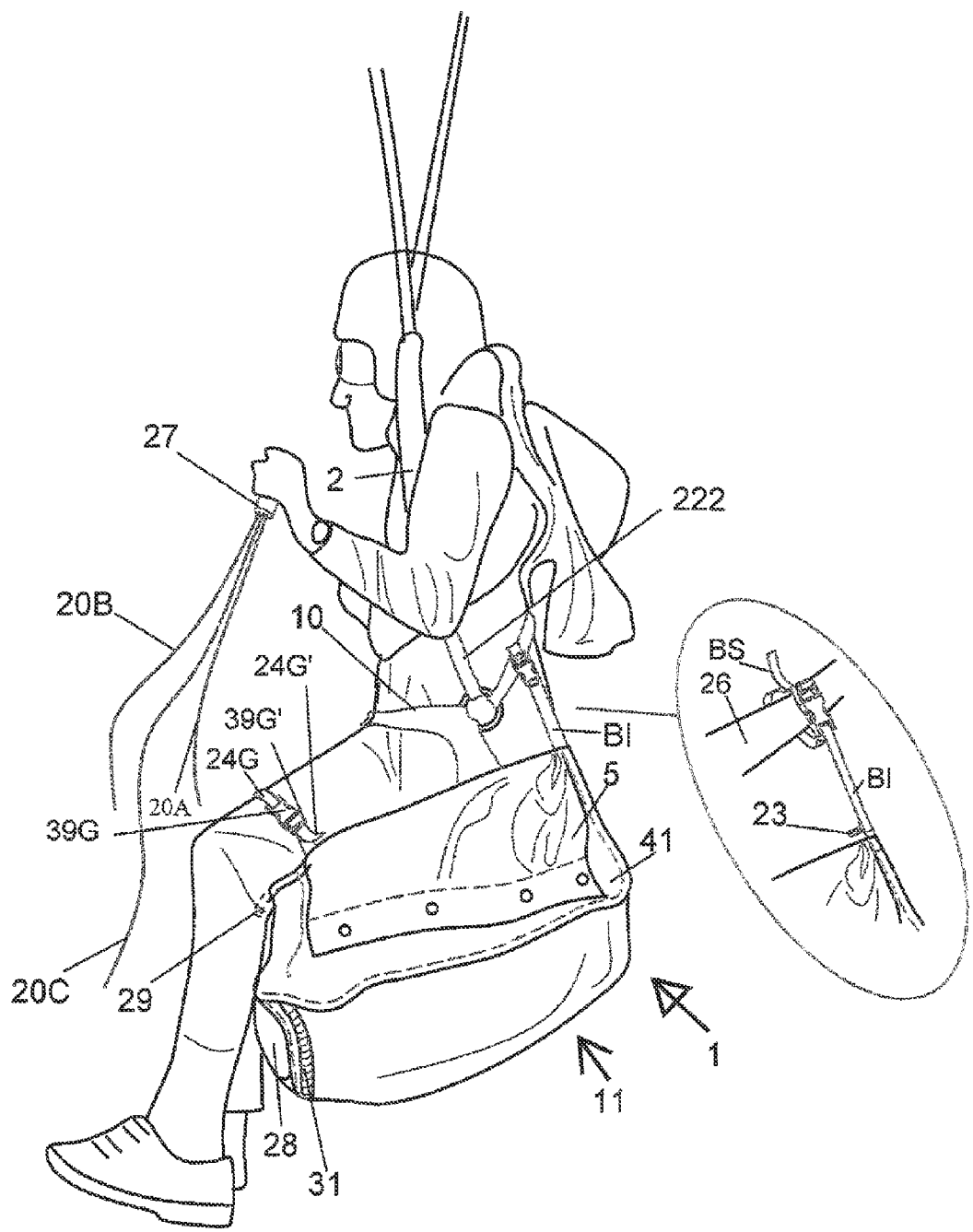
FIG. 5 is a side view of the parachutist equipped with an alternate embodiment of the container of the invention in the open position during the canopy descent.

Once the harness 2 is equipped with the container 1, the latter must at the same time be pressed against the user during the free fall phase preceding the parachute opening as shown in FIG. 2 and then provide a freedom of movement to the parachutist during the canopy descent as shown in FIG. 5.

Accordingly, during the assembly of the container 1 to the harness 2, the length of the strap 25 has been reduced by retracting the "slack" of the lower branch BI such that the container 1 temporarily equipping the harness 2 is maintained close to the user and does not flutter in free fall.

However, for ensuring the parachutist comfort after the container opening during the canopy descent, the container, when connected to the harness, should be able to release the "slack" of the lower branch BI due to the need of a movement performed by the user in the downward longitudinal axis of the strap, to give himself/herself ease.

To obtain such a result, a means for connecting/disconnecting "slack" of the straps is provided, illustrated in detail in FIG. 5 and explained in its corresponding description. In the example given in FIG. 2, only one cutaway cable 20A integral with the handle 27 successively progresses in both loops 23 passing through the slots of each female buckle 25A so as to reduce the "slack" of the adjustable lower branches BI until the parachute opening, and then to release said "slack" during the canopy descent, upon command of the user.

When both lateral flaps 41 and 42 are joined in the closed position by bringing them together edge to edge or by superimposing a lateral flap on the other, performed perpendicularly to the plane of the back pad of the container 1 when the airbag is deployed, they constitute the closing and the protection of the container 1.

This embodiment of the device of the invention allows to reduce the number of members constituting the holding container 1 by removing any type of free flap 5, 6 as subsequently described in alternate embodiments.

In the embodiment of FIG. 2, the container handle 27 is located on the side of the container 1 within reach of the user, the implementation is then ensured by manual extraction, directly executed by pulling the container handle 27 which controls the cutaway cables 20A and 20CC'.

In the embodiment shown in FIG. 3 is shown the device of FIG. 2 in the open position after use and separated from the harness 2, the airbag 11 with a curved cushion shape during inflation, is parallelepiped-shaped comprised of interconnected flaps comprising lateral flaps 41, 42 of the back pad, not visible on the figure, and of the flap 47 extending from the rear edge of the back pad to the front edge of the back pad and connecting the lateral flaps 41, 42 together.

Closing in this embodiment is ensured by folding back the folding edges of the lateral flaps 41, 42 of the airbag 11. It causes its transformation into a holding container, object of the invention.

Folding has the function, in addition to compacting the airbag 11 into an assembly occupying little space during free fall, while neutralizing the air scoop 28, of allowing to form an envelope protecting the rest of the airbag 11 from external stress.

The different folding phases of this embodiment of the container are:

1) the bottom of the airbag 11 is folded back with the air scoop 28 retracted into a tri-fold inwardly and upwardly of the airbag 11 itself;
2) both opposite lateral flaps 41, 42 are then folded back by their folding edges, perpendicularly to the plane of the back pad, by superimposing at the bottom of the airbag 11 previously folded back and acting as airlock for the air scoop 28.

The closing loops 37, 38 arranged close to the rear edge and the front edge of the back pad, as well as the buckles 50 located on the folding edge of the lateral flap 41, can, within a close distance, pass through the grommets 43 arranged on the folding edges of each lateral flap 41, 42.

To maintain the airbag 11 folded under the flaps 41, 42 in place, it is sufficient to pass at least one of both cutaway cables 20CC' through the loops emerging from the grommets 43 of the lateral flaps 41, 42, starting with the upper closing loop 37.

Then, at least one of both cutaway cables 20CC' is passed through the loops 50 emerging from the grommets of the lateral flap 42, and then through the lower closing loop 38 emerging from the grommets 43 of the bottom of the lateral flaps 41, 42.

To improve the wind tightness of the air scoop 28 when the airbag 11 is in the stored/folded position, loops 45 are provided on the front edge of the back pad for cooperating with a gap between guides 40 located on the bottom of the lateral flaps 41, 42.

Thus, to improve maintaining of the ballast 31 in place and ensure the tightness of the closing of the air scoop 28, thereby preventing, during the aircraft exit and the free fall, the relative wind from entering the airbag 11, the end of one of both cables 20CC' is passed, on each side of the bottom of the lateral flaps 41, 42, in the guides 40 without omitting to make it pass through the closing loops 45, upon passage therefor, between the guides 40 arranged side by side.

The distinction between one branch BI and the other branch BS of each of the straps 25 can be noted by a female autolocking buckle 25A arranged at the end of the lower branch BI opposite to its fixation to the container 1, while the upper branch BS is equipped with a sliding male buckle 25B for cooperating with its complementary female buckle 25A.

Figure 4:
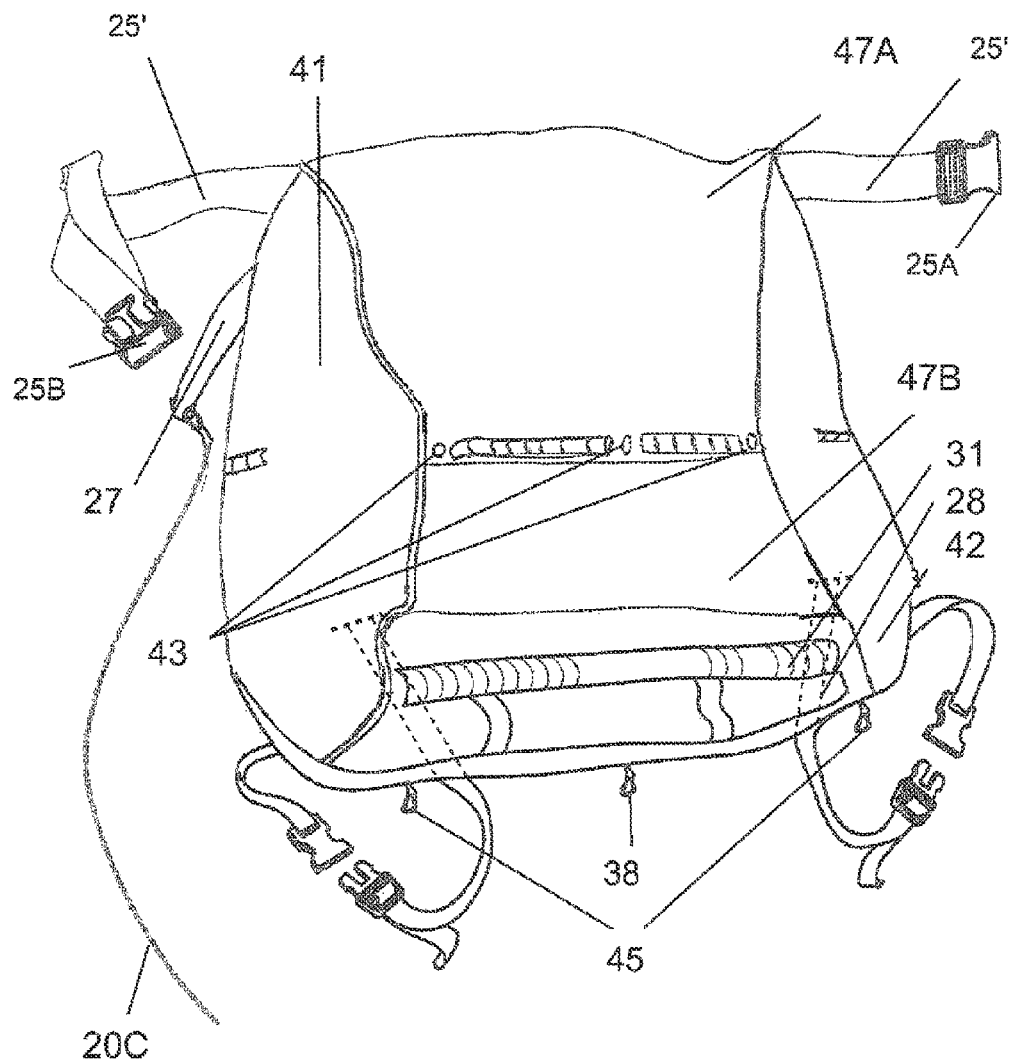
FIG. 4 is a view of an alternate embodiment of the restraining and closing mode of the preferred embodiment.

In the alternate embodiment to close the container of the invention, shown in FIG. 4, the device is shown in the open position after use and separated from the harness, the airbag 11, composed of interconnected flaps as previously described, is adapted to be maintained in a restrained state by closing the upper flap 47A protruding from the rear edge of the back pad and being superimposed on the lower flap 47B protruding from the front edge of the back pad, while the lateral flaps 41, 42 are folded back into a tri-fold from below said flaps 47A and 47B, such a fold acting as an airlock for the air scoop 28.

The assembly is maintained locked with the cutaway cable 20C once the grommets 43 associated to the upper flap 47A cooperate with the corresponding closing loops, such as the closing loops 38, 45 located on the front edge of the back pad.

In FIG. 5 is shown an alternate embodiment of the container of FIG. 2 in the open position equipping a parachutist shown from the side during landing.

The container 1 allowing to integrate the airbag 11 acting as a shock absorbing device has the back pad coming to abut against the lower back and the back of the thighs of the user, and constitutes by its opposite side the internal back pad of the airbag 11.

This alternate embodiment differs in that the container 1 has locking free flaps 5, 6 attached along the lateral edges of the back pad and independently superimposing on the lateral flaps 41, 42 of the airbag 11.

Pulling performed by the user on the container handle 27, as shown in detail, jointly ensures: the release on the right of the length of the lower branch BI of the strap 25 by retracting the cutaway cable 20B, in conjunction with the release on the left of the length of the lower branch BI of the strap 25 by retracting the cutaway cable 20A, and then the full opening of the container 1 is performed by extending the movement on the container handle 27, this last action ensuring the release of the longest cutaway cable 20C out of the closing loops of the container 1.

In the device shown, the airbag 11 is inflated by means of its forward displacement by its air scoop 28 located on the front face oriented toward the lower part of the user's legs, the airbag 11 being inflated, the lateral flaps 41, 42 push back the free flaps 5, 6 which flutter and are no longer useful.

To allow the air flow to access the air scoop 28 and accelerate the inflation of the shock absorbing device, unballasting of the airbag 11, folded on itself, is performed under the effect of the ballast 31 located in a compartment therefor.

When used on the airbag 11 as shown in FIG. 5, the ballasting means are distributed lengthwise to avoid the deformation of the airbag 11 and located below the air scoop 28, they can assist in maintaining the shape of said air scoop.

On the other hand, according to the configuration of the harness 2 for which is intended the equipment, it can be contemplated not to use the ballast, therefore the ballast is preferably used when the container 1 equips a tandem passenger harness since the proximity of the driver placed behind the container 1 tends to maintain the container 1 compressed, thereby hindering after its subsequent opening, the possible unballasting of the airbag 11 due to the friction caused by the proximity of the driver body.

Figure 6:
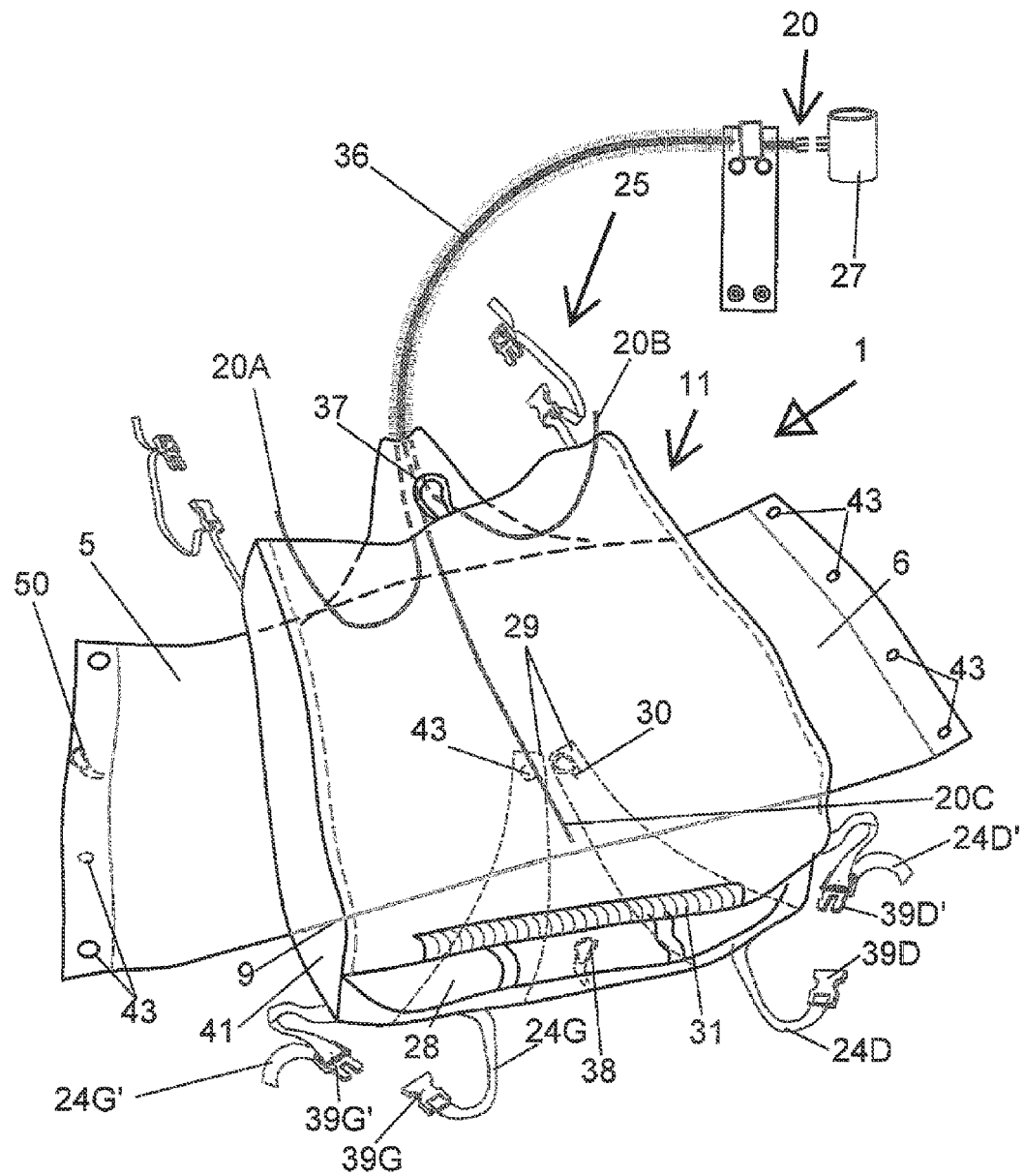
FIG. 6 is a view of the container of FIG. 5 in the open position and separated from the harness before its repackaging.

The device of FIG. 5 is shown in FIG. 6 separated from the harness 2 for an exemplary embodiment of closing after use.

To perform closing of the container 1 after use, the airbag 11 is deflated and then folded by upwardly folding back the bottom of the airbag 11 along the lower packing line 9, which action covers the air scoop 28 and then both opposite lateral flaps 41, 42 are inwardly folded back, perpendicularly to the packing line 9 by superimposing at the bottom of the previously folded airbag 11, acting as an airlock for the air scoop 28 such that a succession of folds is obtained, so that no portion of the airbag 11 protrudes from the container 1.

To achieve locking of the container 1, the assembling means are made to cooperate with each other by passing the grommets 43 of each lateral flap 5, 6 through the end of the associated closing loop, the lateral flap having at least one or more closing loops being arranged below the other flap having the grommets 43 as known in the art.

The upper closing loop 37 allows to pass each of the upper grommets 43 of each free flap 5 and 6, before its locking to pass through the cutaway cable 20C intended for that purpose. The locking operation by passage of the cutaway cable 20C is repeated between each assembling means.

Closing the container 1 is continued after passing the closing loop 50 located on the free flap 5 through the grommet 43 corresponding and associated to the other free flap 6 as known in the art, ensuring locking by means of the cutaway cable 20C.

To improve the closing tightness of the bottom of the container 1, are provided in the improved mode of the invention shown in FIG. 6, two "donkey's ears"-type triangular-shaped lower mini-flaps 29 for covering the bottom of the container 1 so as to better close the air scoop 28 and hold the ballast 31 in place, one of the mini-flaps 29 of this type has a grommet 43 while the other mini-flap 29 has a closing loop 30 intended to cooperate together with the two second before last grommets 43 of the free flaps 5, 6.

Beforehand and in a successive manner are superimposed the grommet 43 associated to the mini-flap 29 on the one having the closing loop 30, and then the second before last lower grommets 43 of both lateral flaps 5, 6, before passing the cable 20C through the emerging loop 30.

To ensure full closing of the container 1, the lower loop 38 located at the periphery of the back pad of the container 1 is then used, in this way, the airbag 11 is maintained compressed for closing the air scoop 28 and thereby avoiding the inopportune inflation of the airbag 11 during free fall.

To perform adjusting of the container around the thighs, the bridles 24D and 24D', as well as 24G and 24G', are closed after locking the male buckles 39D', 39G' and female buckles 39D, 39G together, the user then pulls the free end of each bridle 24D' and 24G', this results in a progressive tightening movement of both bridles 24D' and 24G' around the thighs until a setting determined according to the thickness of the user's thighs, both female buckles 39D and 39G cooperating with the male buckles 39D' and 39G' block all the bridles in position and prevent any loosening, thereby contributing to tensioning the bottom of the container 1 and good pressurizing of the shock absorbing device when the latter is activated.

Figure 7:
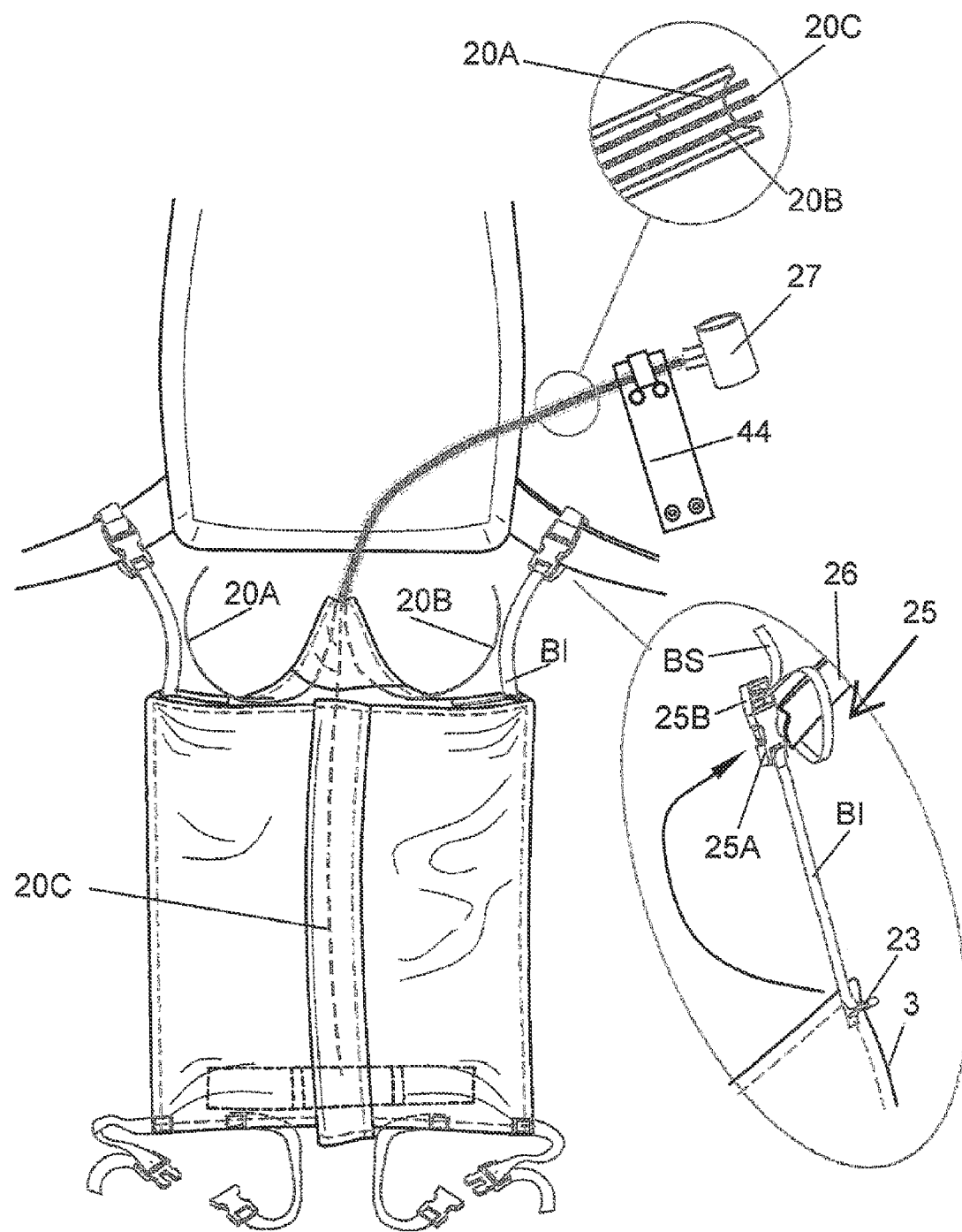
FIG. 7 is a view of a step for assembling the container of FIG. 5 on the harness in the closed position, with the "slack" of the straps not reduced.

In FIG. 7 is shown a step for mounting the container of FIG. 5 on the harness 2.

After obtaining the final folding step, as explained above in FIG. 6, the top of the container 1 is mounted on the harness 2.

In order to interlock, the straps 25 are provided, as mentioned above, with a female locking buckle 25A attached by sewing to the upper end of the fixed branch BI, and with a male locking buckle 25B freely sliding on the upper branch BS. This arrangement allows the upper branch BS to pass circling around each visible portion of the back strap 26 or around the hip rings, or around the main lift webs 222 of the harness, and thus allows the top part of the container 1 to be retained on the harness 2.

In the device according to the invention, shown in FIG. 7, adjusting the length of the upper branches BS of the straps 25 has been performed, after circling around the visible portion of the back strap 26 and after joining, by interlocking, the male buckle 25B located on the top or descending part of the upper branch BS to the complementary female buckle 25A located on the bottom or ascending part at the mid-point of the strap 25.

The remaining "slack" of the strap 25, visible in FIG. 7, is composed of the lower branch BI. This "slack" can be reduced by the fact that each lower branch BI has a length adjustable by means of the passage of a loop 23 attached to the top of the back pad of the container 1, through the slot made in the rectangular support frame of the female buckle 25A, said loop 23 has either one of the cutaway cables 20A, 20B passing therethrough, temporarily reducing the length of the lower branch BI until the action on the container handle 27.

It is noted that a substantially identical result can be obtained by providing an elastic material on the straps 25, allowing to obtain a displacement required for comfort when the container is connected to the harness of a ram-air type parachute.

The container handle 27 is located separated from the container 1, in an offset manner, so as to allow, by means of the cuff 44, its positioning on the harness 2, to a location preferred by the user. The container handle 27 extends by a triple cutaway cable 20 shown in detail at the top of FIG. 7, and comprised of cables 20A, 20B and 20C intended to be manually pulled after the main parachute opening so as to cause the "slack" release of the strap of each lower branch BI between the container 1 and the harness 2, and simultaneously with the container opening.

Figure 8:
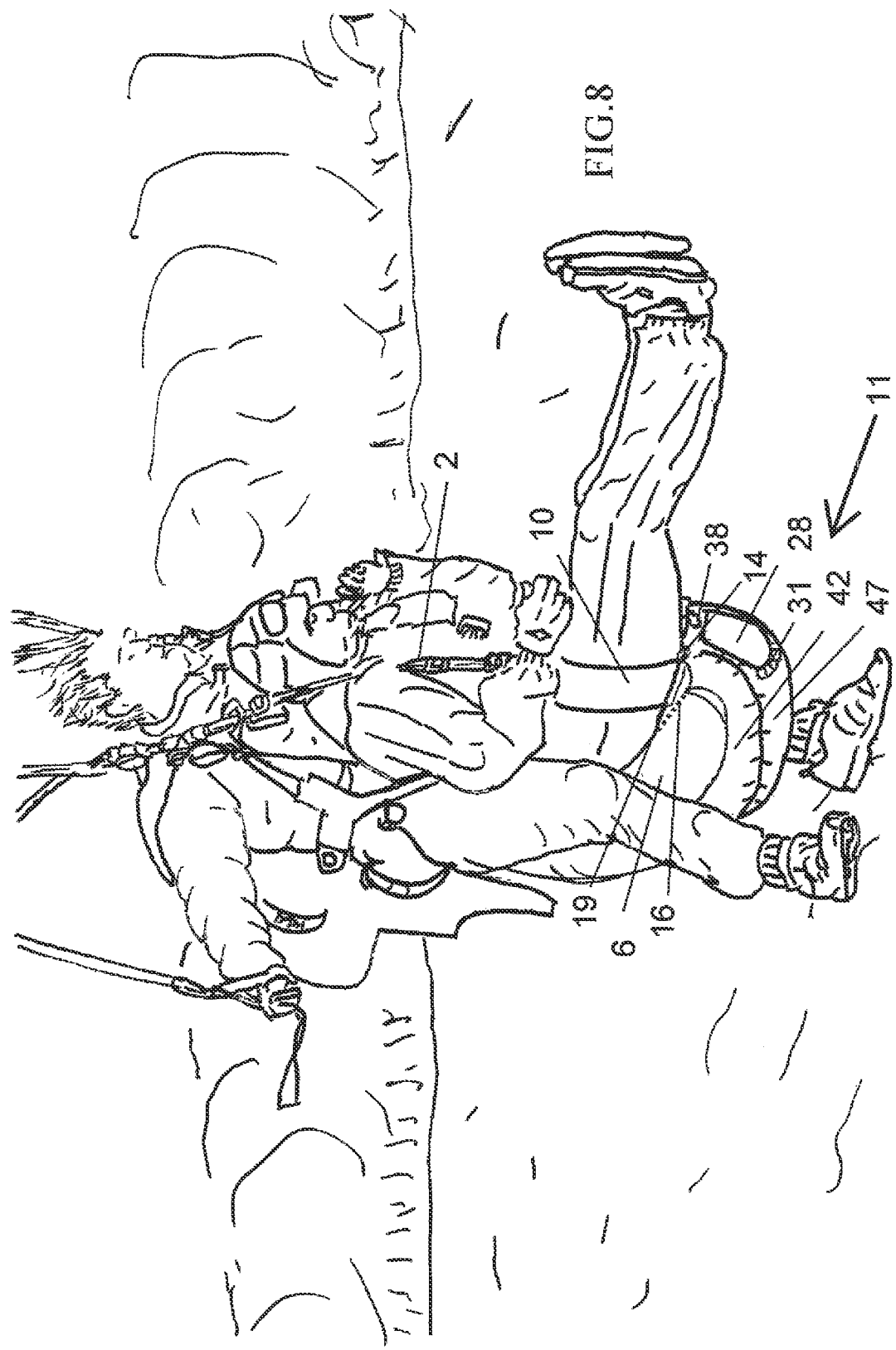
FIG. 8 is a front three-quarter view of a container according to another embodiment of the invention, arranged on a tandem passenger harness, shown in the open state and with the airbag inflated.

FIG. 8 is a general perspective of the container of the invention permanently arranged on a tandem passenger harness and shown in the open position with the airbag 11 acting as a shock absorbing device, comprised of a single compartment, deployed in its maximum-volume inflated configuration during the canopy descent.

In the configuration shown in FIG. 8, the container of the invention is symmetrically provided with two free lateral flaps 5, 6, only the flap 6 being shown. It is noted, similarly to FIG. 5, that during inflation of the airbag 11, the now inoperative free flap 6 naturally moves away on its side, in a similar manner as the free flap 5 which is not visible in the figure.

The spacing of the free flaps 5, 6 is facilitated by the action of pull-up cords 16, 17 integral by one of their end with the lower angle of each free flap 5, 6, and coupled by the other end with the container handle 27, via a shock cord 35, thereby helping the airbag 11 to automatically unballast and unfold. Thus, after operating the container handle 27 for jointly controlling the opening of the container 1 and pulling up the free flaps 5, 6 by their respective pull-up cord 16, 17, the free lower angle of each free flap 5, 6 is pulled back in an outward corner shape, thereby ensuring that one moves away from the other. Such an arrangement provides the advantage of opening the container 1 and helps to deploy the airbag 11 without any further manual action for implementing the shock absorbing device.

Maintaining the bottom of the container 1 is further ensured, in addition to the seams made on the harness 2, by guides 19 integral with the container 1 and by the connection between the harness 2 and the container 1 by means of flexible or metal rapid links (also known as quick-release fasteners) 14 between loops arranged on the container 1 and hooking points located on the legpads 10 of the harness 2.

This last arrangement allows to especially ensure the lateral tensioning of the bottom of the container 1, depending on the spacing from one thigh to the other during the canopy descent, which situation promotes the deployment of the airbag 11 and its inflation in the relative wind performed by exposing the air scoop 28 located on the flap 27, more precisely on the front face of the inflatable cushion, oriented toward the lower part of the user's legs.

It will be noted that, although the rapid links 14 are useful to help laterally tensioning the back pad of the container 1, and consequently the airbag 11, in a determined position, they are not essential for an appropriate operation of the device and can be removed.

The embodiment shown in FIG. 8, ensuring the container 1 is maintained at the legpads 10, shows a "short" version of the container compared with the above-mentioned examples, and consequently, leaves the passage for a load-unballasting cord between the user's thighs free.

Depending on the desired effect, a protecting surface can be ensured to the user's lower limbs, which is greater than that shown in FIG. 8, by extending the container 1 beyond the legpads 10, provided that bridles 24 and their buckles 29 associated to the bottom of the container 1 extended as shown in FIG. 5 are added so as to secure the extension of the bottom of the container 1 into a lower part of the user's thighs and allow to shape the airbag 11.

Figure 9:
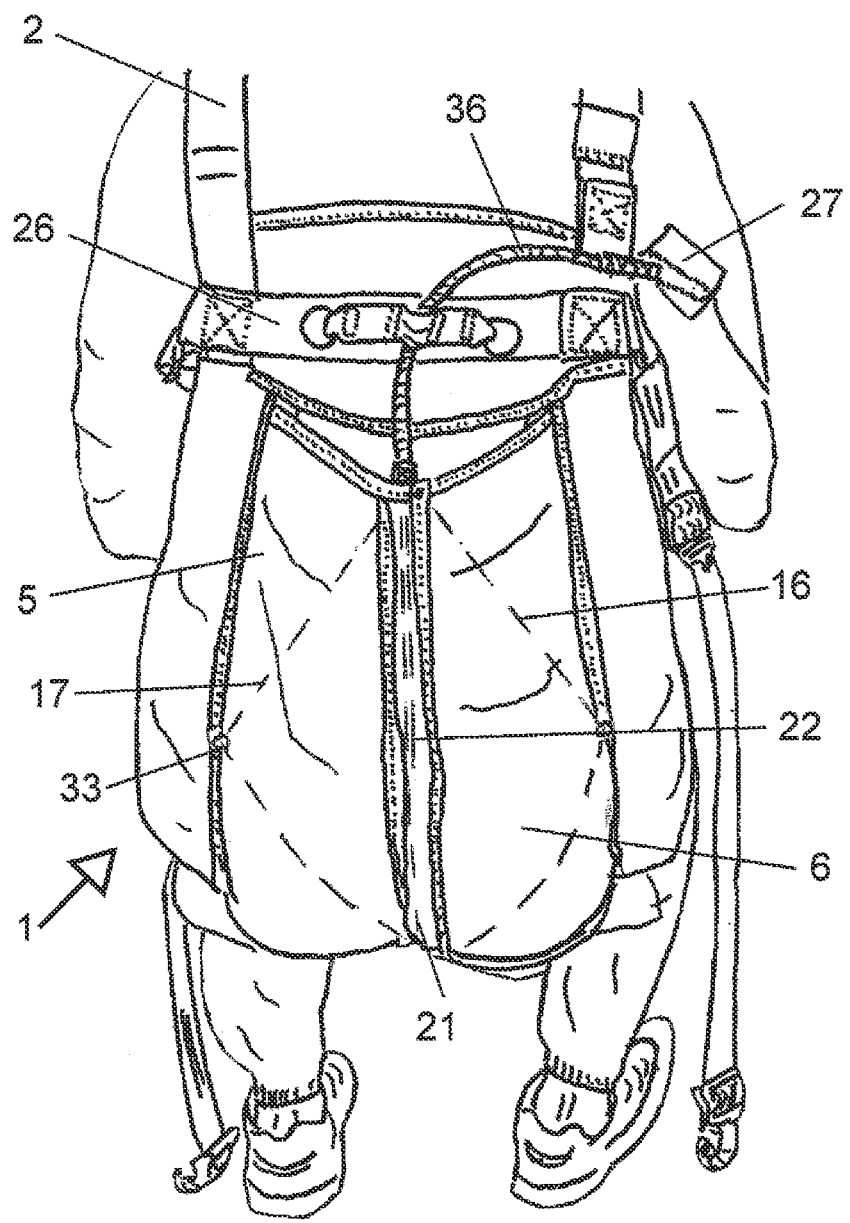
FIG. 9 is a back view of the container of FIG. 8 shown in the closed state before use, with a parachutist equipped with the invention.

FIG. 9 is a back view of the same container than that of FIG. 8 represented in the state preceding the opening thereof.

In this embodiment of the invention, the means for hooking the back pad of the container 1 to the harness 2 are comprised of seams located at the top of the container 1 near or substantially at the level of the back strap 26, the "slack" required by the user for moving backwards in the harness 2 during the canopy descent being provided by designing fold-over pleats in the back pad of the container 1.

The arrangement of the closed container 1, as shown in FIG. 9, is perfectly adapted to free fall with a low thickness in terms of bulk and neutralizing the airbag 11 of the air flow.

The opening control housing 36 integrates the passage of cutaway cable(s) 21, (22) connected by one end to the container handle 27 as well as the not shown shock cord 35, which controls the removal of the pull-up cords 16, 17, the opposite ends of which are attached to each free lower angle of the free flaps 5, 6.

Figure 12:
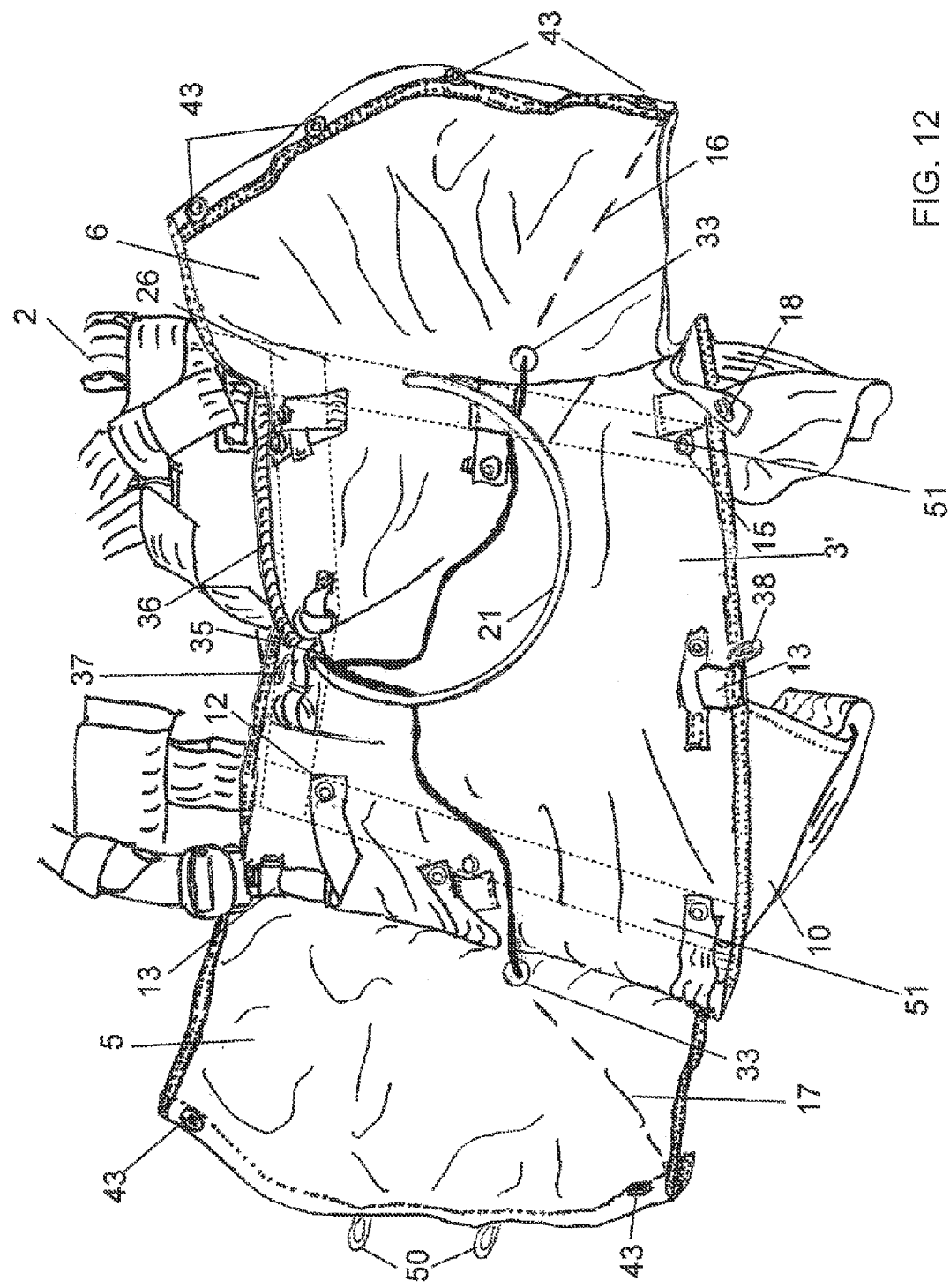
FIG. 12 is a view of the opposite side of the back pad of the container of FIGS. 8, 9 and 10, without the airbag of FIG. 11.

The pull-up cords 16, 17 are partially protected by a double wall included in the free flaps 5, 6 and each pass through a ring 33 provided on the inner edge of said free flaps, and the operation of which is explained in detail in FIG. 12.

Figure 10:
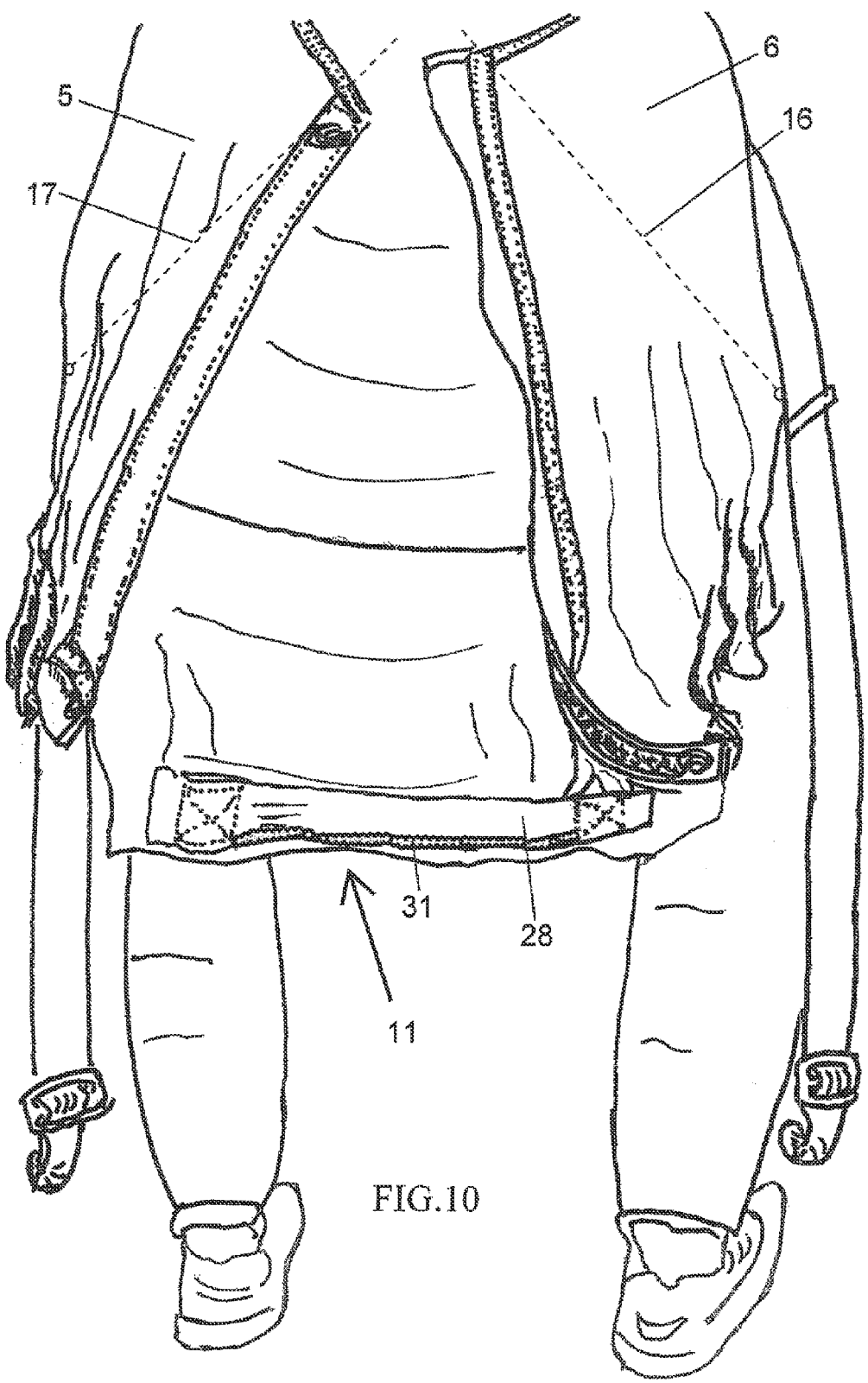
FIG. 10 is a back view of the container of FIG. 8 shown in the open state with a parachutist equipped with the invention.

In FIG. 10, the parachutist seen from the back has operated the opening of the container 1 for obtaining a result such as shown from the side in FIG. 8, the free flaps 5, 6 have naturally spaced away from each other from below under the combined effect of the pull-up cords 16, 17 which pull the free lower angle of each free flap 5, 6 into a corner shape. The fabric pleated at the lower angle of each free flap 5, 6 exposes an opening of the bottom of the container 1 such that unballasting the airbag 11 is facilitated. Thus, the ballast 31 helps the gravitation of the airbag 11 and the windage of the air scoop 28 allows to inflate and fill the airbag 11.

Figure 11:
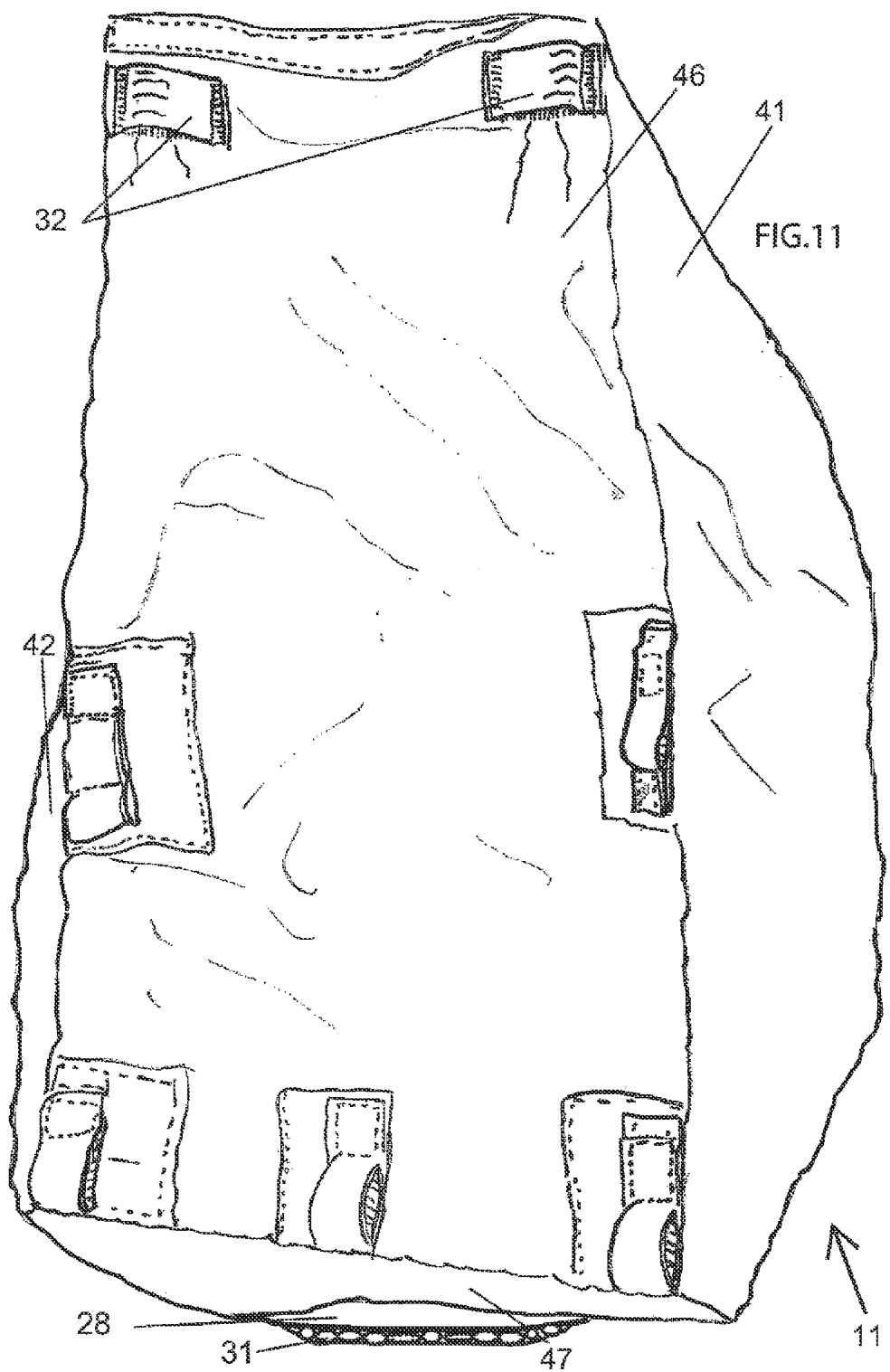
FIG. 11 is a back view of the removable airbag arranged in the container described in FIGS. 8, 9 and 10.

FIG. 11 is a view of the hooking device attached to the back of the airbag 11 made removable for maintenance, or other purposes, of the container 1 when the latter is permanently attached to the harness 2, such as shown in FIGS. 8, 9 and 10.

The back of the airbag 11 shown in FIG. 11 is comprised of the bottom flap 46 forming one of the four inter-connected flaps giving the airbag 11 a curved crescent shape during inflation, the other flaps visible in FIG. 11 are comprised of lateral flaps 41, 42 and of the lower part of the flap 47 which represents the front face of the inflatable cushion on which is the air scoop 28, shaped by the weight of the ballast 31.

In FIG. 11 is shown the back of the airbag 11 with a number of simple loops 32 for cooperating with as many webbings 12 attached on the opposite side 3' of the back pad of the container 1. Such as an example is given in FIG. 12.

The means for attaching the airbag 11 to the opposite side 3' of the back pad of the container 1 can be comprised of fasteners different from these numbered 32 at the back of the airbag 11, for cooperating with as many complementary fasteners 13 and 12 located on the opposite side 3' of the back pad of the container 1, as shown in FIG. 12.

FIG. 12 is an inside view of an embodiment of the container 1 of FIGS. 8, 9 and 10 shown open without the airbag 11, showing the inner faces of the free flaps 5, 6 and the opposite side 3' of the back pad permanently attached by seaming to the back strap 26 and the webbing bridges 51 of the legstraps.

Is especially shown the means for hooking the airbag 11, allowing to place it on the opposite side 3' of the back pad of the container 1 when the latter is permanently attached to the harness 2, this hooking means being comprised of a tunnel system 13 attached to the opposite side 3' of the back pad of the container 1 by its two ends and a webbing 12 provided with female 18 and male snaps 15.

As shown in FIG. 12, the opposite side 3' of the back pad is provided with two tunnels 13 sewn in the horizontal direction and five tunnels 13 sewn in the vertical direction, the seven tunnels 13 are each comprised of a strip sewn at both its ends, crossed by a webbing 12 sewn by only one end, the other end of the webbing 12 is free and provided with a female snap 18 for cooperating with a male snap 15 arranged on the opposite side 3' of the back pad of the container 1 at a distance such that the length of the webbing 12 allows the combined passage of the simple loop 32 and of the tunnel 13 so as to secure the hooking operation of the airbag 11.

Thus, when the airbag 11 is mounted on the opposite side 3' of the back pad of the container 1, the webbing 12 slides through two rows of simple loops 32 and 13 arranged side by side, thus the airbag 11 is not directly subjected to a stress during the ground impact, the passage of the webbing 12 in the simple loops 32 and 13 forming cross-bars.

The arrangement of the male 15 and female snaps 18 can obviously be reversed, it is also possible to place the webbings 12 and the tunnels 13 on the back of the airbag 11 while the opposite side 3' of the back pad of the container 1 is provided with an associated number of the simple loops 32 only.

In a simplified embodiment, the hooking means provided on the opposite side 3' of the back pad of the container 1, at the risk of a less substantial link, can be contemplated without the tunnel 13 located on the opposite side 3' of the back pad of the container 1. The hooking means can also be restricted to fewer fasteners, for example to the number of four fasteners located at each angle of the airbag 11, with each of these corresponding complementary fasteners being located facing the opposite side 3' of the back pad.

Unique and simultaneous pull-up control means of the free flaps 5, 6 are provided, arranged with the means for opening the container 1 for simultaneously opening the container 1 and pulling up the free lower end of the free flaps 5, 6 such that they have an outward corner shape as shown in FIG. 8. This arrangement allows the airbag 11 to more easily unballast by gravitation.

This device is characterized in that a pull-up cord 16, 17 is attached to the free lower corner of each free flap 5 or 6 and diagonally moves on the width of each free flap 5, 6 in a double wall before passing through a ring 33 located near the inner edge of said free flap, for reaching the opposite side 3' of the back pad of said container 1 and independently pursuing its movement before being attached to the shock cord 35 itself connected to the handle 27, the ring 33 is preferably a grommet.

According to this embodiment shown in FIG. 12, these two pull-up cords 16, 17 are comprised of two portions of a one and only strand joining each other by forming a central loop which will be connected to the container handle 27 by a shock cord 35, which has the advantage of holding only one loop inside the housing 36. The shock cord 35 is adjustable in length from the container handle 27. The shock material has the advantage, when the container handle 27 is pulled, of tensioning before acting on the free flaps 5, 6. In this way, the bottom of the free flaps 5, 6 is not urged before the removal of the end of the cutaway cable 21.

After use, the pull-up device described in FIG. 12 is very quickly and very easily used again during the folding phase by a simple tensioning of the folded end of the free flaps 5, 6 for obtaining a result such as shown in FIG. 12.

The means for assembling the free flaps 5, 6 are comprised of, as known in the art, closing loops 37 and 38 located at the center of the rear and front edges on the back pad or on the opposite side 3' of the back pad of the container 1; other buckles 50 and grommets 43 arranged facing each other on the free flaps 5, 6 cooperate with one another for allowing, after superimposing the free flaps 5, 6, locking by the cable 21.

Figure 13:
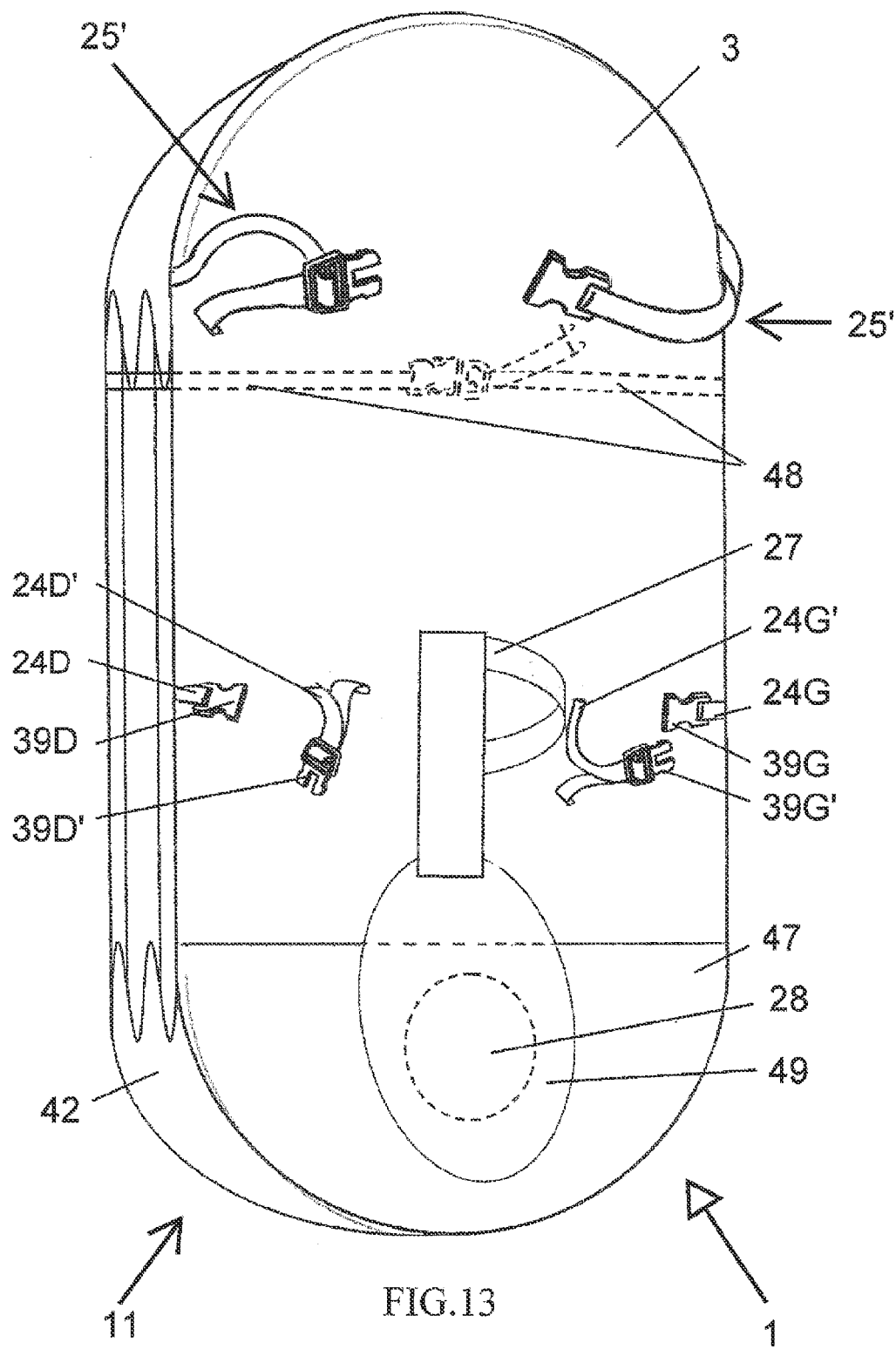
FIG. 13 is a bottom schematic view of a simplified embodiment of the invention.

FIG. 13 shows a simplified embodiment of the invention in which the airbag 11 constitutes the container 1, comprised of lateral flaps 41, 42 assembled along the edges in the length of the back pad 3, as well as the flap 47 extending from the rear edge of the back pad 3 to its front edge.

FIG. 13 shows the container closed before use, the flap 42 and the non-visible flap 41 form the lateral edges of the airbag 11 and fold back in an accordion fold between the back pad 3 and the flap 47, temporarily held by a double belt 48 encircling the flaps together by means of a male and female closing loops adapted to cooperate with each other.

The back pad 3 intended to rest against the lower back and the back of the thighs of the user has bridles 24D, 24D' and 24G, 24G' so as to secure the container 1 to the user's thighs or to the legstraps by means of the buckles 39D, 39D' and 39G, 39G' as previously explained, while the half-belts 25' arranged in an identical manner as in FIG. 1 form an abdominal belt allowing the top of the container 1 to be hooked by encircling the user's waist.

The air scoop 28 located on the flap 47, at the front face of the airbag 11, is closed by an airlock 49 held in place by gripping strip or any other holding means. The airlock 49 is connected to a container handle 27 which remains secured by one of its ends to the airbag 11 acting as a container 1.

Figure 14:
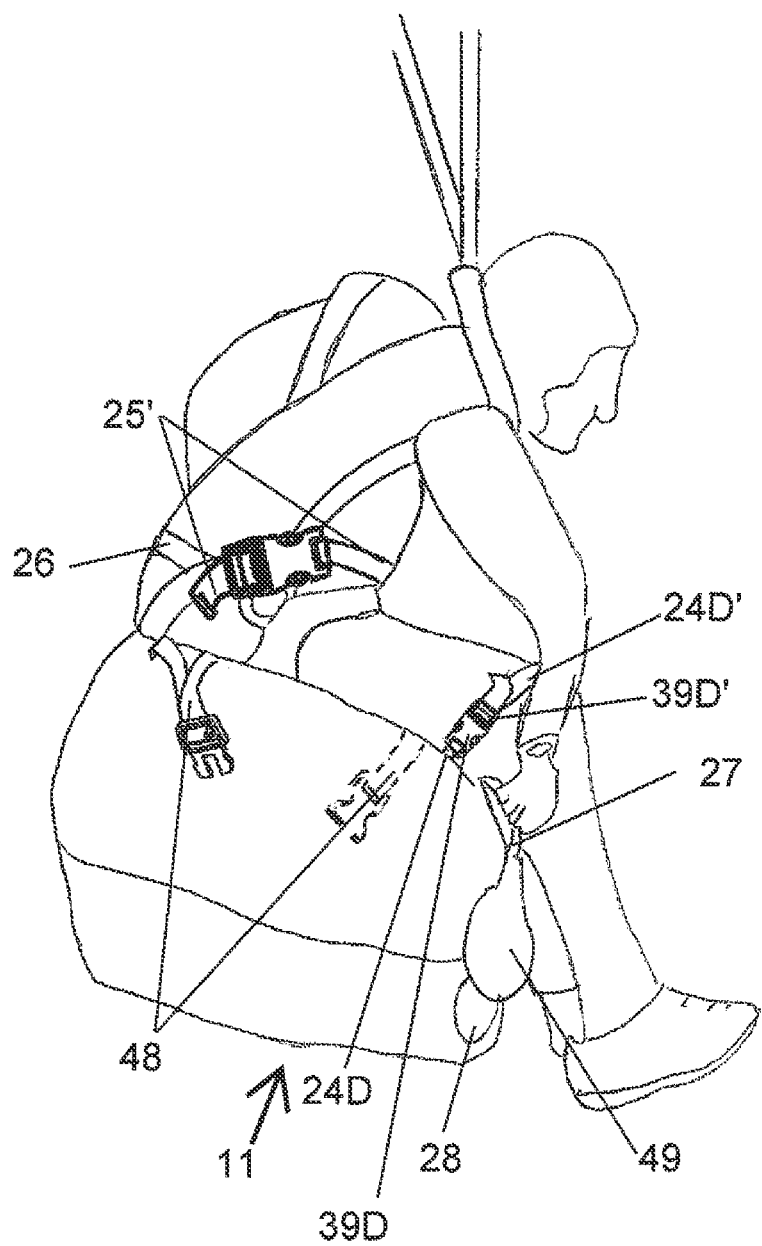
FIG. 14 is a side view of a parachutist equipped with the device of FIG. 13 in the open position during the canopy descent.

In FIG. 14 is shown from the side the container 1 of FIG. 13 equipping a parachutist and implemented by the user after the opening of its parachute, thus a first action consists in undoing the buckles of the belts 48 so as to unballast the airbag 11 and pull the container handle 27 located at the bottom of the back pad 3, which has the effect of releasing the airlock 49 for opening the air scoop 28 and inflating the airbag 11 when the container moves forward during the canopy descent.

In this simplified version of the container shown in FIG. 14, maintaining the top of the back pad 3 of the container 1 on the user is ensured by directly attaching the half-belts 25', connected together to the user's waist via buckles, such that it is not useful to provide "slack" between the container 1 and the harness 2 for giving more ease to the user during the canopy descent. The means for attaching the bottom of the back pad 3 of the container 1 is made by legstrap bridles 24 and their corresponding buckles 39 as mentioned above.

In FIG. 15 is shown the container of the invention in the closed position, arranged on the back and between the rails 55 for raising a pallet 52 equipped with an airdropped package 53 harnessed to a parachute harness 54, such that the flaps 5, 6 are not in contact with the aircraft hold. The straps 25 hold the four angles of the container at each corner of the pallet 52 and the double cutaway cable 20CC' is connected by a link to one of the elevator groups belonging to the parachute of the airdropped package 53 such that, during the parachute opening which occurs either after the package exiting out of the aircraft, or by triggering an automatic parachute ripcord release (barometric-variometric) device, the tensioning of the elevator group causes the extraction of the cutaway cable 20CC' and the deployment of the airbag 11 by means of a hoop device of the type described when the container equips a round parachute harness.

Various arrangements and alternatives of the package can furthermore be contemplated.

Closing the described device(s) can also be contemplated with a different order, provided that the means for locking the flaps are modified, with the flap still having grommets in the folded position above the flap carrying the buckles.

In a similar way, one can contemplate that the means for restraining the airbag 11 be comprised of only one free flap perpendicular to the plane of the back pad of the container when the airbag is deployed, the size of which covers the surface area of the back pad so as to cover the entire airbag and provided with a hooking means such as buckles adapted for cooperating with a complementary hooking means such as grommets oppositely located on the back pad of the side opposite to the side to which said lateral free flap is attached. The passage through the buckles emerging from a cutaway cable connected to a container handle, such as mentioned above, ensures to restrain and neutralize the device.

The arrangement of the male 25B and female buckles 25A on the straps 25 can be reversed, and also any further clamping and blocking device, of the male and female dot fastener-type, such as by gripping strip, for example by a locking system, or any further device known to the one skilled in the art, can be provided.

In the scope of the use of the container of the invention for parachute jumps performed with round parachutes, it has been noted that, after the container opening, the parachute movement speed (5-6 meters/second) is lower than with ram-air type parachutes (about 10 meters/second), such that the air flow obtained by movement is not sufficient to obtain a spontaneous inflation of the airbag.

To overcome this disadvantage, the air inlet is forced by providing a deployment aid for the flap provided with air inlet, located on the airbag face frontmost of the movement. Such a flap has on its periphery one or more flexible-frame hoops for better exposing the air inlet and channeling the flow after the container opening. The hoop(s) is(are) maintained folded by the flaps of the container and deploys (deploy) during the manual or automatic container opening so as to facilitate the inflation and shaping of the airbag. Each hoop is comprised of a material having spring-effect folding and unfolding properties, of the wire puller nylon type of 4 mm, used for passing cables through sheathings.

Once the hoops are unfolded, these constitute a structure that pushes back the free flaps and opens the air scoop(s) located on the first face exposed to the relative wind.

According to an improvement of the device not departing from the scope of the invention, it is possible to automatically couple the container opening with the load bag unballasting by hooking the cutaway cable of the flaps of the container by a metal or textile link-type linking means, for example with the system for releasing the load bag so as to trigger the automatic deployment of the inflatable cushion under the protection region after the main parachute opening.

Coupling the implementation of the shock absorbing device with unballasting of the load bag is an arrangement particularly intended to airborne troop jumps performed at a low height with an automatic opening of the main parachute.

Depending on the length of the container, a greater number of associated closing loops and grommets than those mentioned above in the examples can be contemplated.

The means for interlocking the flaps not limiting the invention in any way, they are simply intended to ensure the flaps, once closed, are maintained in the locked position.

It is also possible, in the above-mentioned devices of the invention, to add a free upper flap without departing from the scope of the invention.

The airbag is preferably comprised of a flexible fabric material used in lightweight aeronautics or a similar airtight or substantially airtight material, facilitating its expansion.

The airbag can have several central or lateral air inlets for facilitating its inflation during the descent, the air inlets being arranged so as to be accessible to the air flow after the container opening. The air scoop(s) can have different sizes. The airbag volume can have any volume, even doubled with respect to what is shown in the drawings, without changing the principle of the invention.

In the scope of the use of means for adjusting and clamping the bridles 24, the straps 25 or the half-belts 25', any type of quick-release buckles or double-slide ring can be used. Other similar adjusting systems are possible such as those of the self-gripping means-, adjusting thumb wheel-, lock nob-, notches for quickly and efficiently adjusting, depending on the wearer morphology-type.

The device according to the invention can be adapted to all pallets intended to drop packages, the back pad of the container is then tied up to the back of the pallet between two rails which are raised with respect to the hold bearings.

LIST OF REFERENCE NUMERALS IN THE DRAWINGS 1 container
2 harness
222 main lift web
3 back pad of the container
3' opposite side of the back pad
5 free left lateral flap
6 free right lateral flap
9 lower packing line
10 legpad
11 airbag
12 webbing with free end
13 tunnel sewn on the opposite side of the back pad
14 rapid link
15 male snap
16 right pull-up cord
17 left pull-up cord
18 female snap
19 guide
20 triple cutaway cable
20A lateral cutaway cable of the slack from the container
20B other lateral cutaway cable of the slack from the container
20C flaps cutaway cable
20CC' flaps cutaway double cable
21 long cutaway cable
22 short cutaway cable
23 loop on the upper container
24 bridle
24D right bridle
24G left bridle
24D' right adjustable bridle
24G' left adjustable bridle
25 strap
25' half-belt
25A female autolocking buckle
25B male autolocking buckle
26 back strap
27 container handle
28 air scoop
29 mini-flap
30 closing loop of the mini-flap 29
31 ballast
32 simple loop of the airbag
33 ring
35 shock cord
36 housing
37 upper closing loop
38 lower closing loop
39D right female buckle
39G left female buckle
39D' right male buckle
39G' left male buckle
40 cutaway cable guide
41 left lateral flap
42 right lateral flap
43 grommet
44 cuff
45 down closing loop
46 bottom flap
47 flap
47A upper flap
47B lower flap
48 belt
49 airlock
50 lateral buckle
51 webbing bridge to the legstraps
52 pallet
53 airdropped package
54 parachute harness
55 pallett rail
BI lower branch of the strap 25
BS upper branch of the strap 25

SEQUENCE LISTING

Not Applicable

The invention claimed is:

1. A container for skydiving, comprising:
a back pad,
an airbag fixed on a face of the back pad, the airbag including a face that in use faces an air flow resulting from a skydive, the airbag being inflatable into an inflated airbag, the airbag having at least one air scoop formed on a leading face of the inflated airbag, the leading face being the face of the inflated airbag facing the air flow during the skydive,
restraining means for restraining the airbag in a folded position against the back pad, such that in the folded position, during a free fall phase of the skydive, the container is flat and the at least one air scoop is blocked,
an opening system operable to trigger release of the restraining means and to inflate the airbag by movement of the container with respect to the air flow resulting from the skydive moving into the at least one air scoop, and means for attaching the container to at least one of the group consisting of a harness, a skydiver, and an airdropped package.

2. The container according to claim 1, wherein the airbag is comprised of a flexible airtight bag, the at least one air scoop opening on at least one chamber inside the flexible airtight bag.

3. The container according to claim 2, wherein the at least one chamber is shaped by hoops, the hoops being maintained folded by the restraining means in the folded position of the airbag.

4. The container according to claim 1, wherein a ballast is attached on the edge of the at least one air scoop or on the leading face of the airbag.

5. The container according to claim 1, wherein the airbag has one air scoop, a flap is arranged in front of the air scoop for closing the air scoop, the flap being operable by a user for exposing the air scoop of the airbag so as to deploy the airbag.

6. The container according to claim 1, wherein the airbag is removably attached to the back pad.

7. The container according to claim 1, wherein the airbag is permanently attached to the back pad.

8. The container according to claim 1, wherein the inflated airbag has two opposite parallel flaps, substantially perpendicular to a plane of the back pad and extending from lateral edges of the back pad, the means for restraining the airbag comprising first hooking means carried by one of the two flaps engaging with second hooking means carried by another one of the two flaps so as to hook the two flaps to each other and thus compress the airbag and close the air scoop.

9. The container according to claim 8, wherein the first and second hooking means comprise a closing loop and grommet system, where the loops are adapted to be passed through the grommets arranged facing each other, and a cutaway cable is adapted to be passed through the loops, the cutaway cable being connected to a container handle.

10. The container according to claim 1, wherein the inflated airbag has two opposite parallel flaps, substantially perpendicular to a plane of the back pad and extending from lateral edges of the back pad, the means for restraining the airbag comprising first hooking means carried by a first one of the two flaps engaging with second hooking means carried by a second one of the two flaps so as to hook the two flaps to each other and thus compress the airbag and close the air scoop, the first and second hooking means further engaging with third hooking means carried by the back pad.

11. The container according to claim 10, wherein the first and second hooking means comprise a closing loop and grommet system, where the loops are adapted to be passed through the grommets arranged facing each other, and a cutaway cable is adapted to be passed through the loops, the cutaway cable being connected to a container handle.

12. The container according to claim 1, wherein the inflated airbag has two opposite parallel flaps, substantially perpendicular to a plane of the back pad and extending from lateral edges of the back pad, the means for restraining the airbag comprising first hooking means carried by a first one of the two flaps engaging with second hooking means carried by a second one of the two flaps so as to hook the two flaps to each other and thus compress the airbag and close the air scoop, the first and second hooking means further engaging with third hooking means carried by the airbag.

13. The container according to claim 12, wherein the first and second hooking means comprise a closing loop and grommet system, where the loops are adapted to be passed through the grommets arranged facing each other, and a cutaway cable is adapted to be passed through the loops, the cutaway cable being connected to a container handle.

14. A system comprising a harness with legstraps and a container according to claim 1, wherein a portion of the back pad is attached to a lower half of the harness, the means for attaching being constituted by bridles integral with the container, a remaining portion of the back pad of the container being adapted to be attached to each of a user's thighs by the bridles closing around each of the user's thighs or around the legstraps.

15. A system comprising a harness with legstraps and a container according to claim 1, wherein the means for attaching are constituted at a top of the container by straps and at a bottom of the container by bridles, the back pad being removably attached at an end by the straps located on the top of the container closing by a first locking means on the harness the back pad being removably attached and at another end to one of the legstraps and to each of a user's thighs by the bridles located on the bottom of container closing around the legstraps or around each of the user's thighs.

16. The system according to claim 15, wherein the straps have a second locking means which can be unlocked by the user, at a distance from the first locking means such that the first locking means locks each strap around the harness, the second locking means closes the strap on itself, the unlocking of the second locking means allowing the strap to pass from a first length to a second length greater than the first length.

17. A container for skydiving, comprising:
a back pad;
a strap located on the back pad, the strap being adapted to attach the back pad to a user;
an airbag attached to the back pad, the airbag comprising a leading face with an air scoop, the airbag having
i) a non-deployed configuration in which the airbag is folded against the back pad with the air scoop blocked and non-accessible to an air flow created during a free fall phase of a skydive, and
ii) a deployed configuration in which the air scoop is not blocked and is accessible to the air flow created during the free fall phase of the skydive, the airbag being inflatable by the air flow entering the air scope and inflating the airbag;
a restraining system that restrains the airbag in the non-deployed position with the airbag folded against the back pad; and
a handle that is operable, during the free fall phase of the skydive, to trigger release of the restraining system and deploy the airbag from the non-deployed configuration to the deployed configuration thereby rendering the air scoop accessible to the air flow created during the free fall phase of the skydive so that the air flow enters the air scoop and inflates the airbag.

* * * * *